United States Patent [19]

Lee

[11] Patent Number: 5,107,345

[45] Date of Patent: Apr. 21, 1992

[54] ADAPTIVE BLOCK SIZE IMAGE COMPRESSION METHOD AND SYSTEM

[75] Inventor: Chong U. Lee, San Diego, Calif.

[73] Assignee: Qualcomm Incorporated

[21] Appl. No.: 705,840

[22] Filed: May 28, 1991

Related U.S. Application Data

[63] Continuation of Ser. No. 487,012, Feb. 27, 1990, Pat. No. 5,021,891.

[51] Int. Cl.[5] .......................................... H04N 1/415
[52] U.S. Cl. .................................... 358/432; 358/433; 358/136; 358/261.1; 358/261.4; 382/41
[58] Field of Search ................ 358/261.4, 261.2, 261.1, 358/261.3, 433, 432, 133, 135, 136; 382/56, 41; 364/725

[56] References Cited

U.S. PATENT DOCUMENTS

| | | | |
|---|---|---|---|
| 4,179,709 | 12/1979 | Workman | 358/433 |
| 4,293,920 | 10/1981 | Merola | 358/432 |
| 4,504,860 | 3/1985 | Nicol et al. | 358/432 |
| 4,751,742 | 6/1988 | Meeker | 382/56 |
| 4,772,956 | 9/1988 | Roche et al. | 358/133 |
| 4,774,574 | 9/1988 | Daly et al. | 358/133 |
| 4,776,030 | 10/1988 | Tzois | 382/56 |
| 4,807,042 | 2/1989 | Tanaka | 358/433 |
| 4,922,341 | 5/1990 | Strobach | 358/156 |
| 4,924,309 | 5/1990 | Hartnack et al. | 358/133 |
| 4,969,040 | 11/1990 | Gharavi | 358/135 |
| 4,999,715 | 3/1991 | Porcellio et al. | 358/433 |
| 5,031,038 | 7/1991 | Gisillemot et al. | 358/136 |

OTHER PUBLICATIONS

"Discrete Cosine Transform", by N. Ahmed et al., *IEEE Transactions on Computers*, Jan. 1974, pp. 90-93.
"Adaptive Coding of Monochrome and Color Images", by Wen-Hsiung Chen et al., *IEEE Transactions on Communications*, vol. Com-25, No. 11, No. 1977, pp. 1285-1292.
"Interframe Consine Transform Image Coding", by John A. Roese et al., *IEEE Transactions on Communications*, vol. Com-25, No. 11, Nov. 1977, pp. 1329-1339.
"Distributions of the Two-Dimensional DCT Coefficients for Images", by Randall C. Reininger et al., *IEEE Transactions on Communications*, vol. Com-31, No. 6, Jun. 1983, pp. 835-839.
"Scene Adaptive Coder", by Wen-Hsiung Chen et al., *IEEE Transactions on Communications*, vol. Com-32, No. 3, Mar. 1984, pp. 225-232.
"Hamming Coding of DCT-Compressed Images over Noisy Channels", by David R. Comstock et al., *IEEE Transactions on Communications*, vol. Com-32, No. 7, Jul. 1984, pp. 856-861.

*Primary Examiner*—Edward L. Coles, Sr.

[57] ABSTRACT

An image compression system and method for compressing image data for transmission. Each block and corresponding sub-blocks of pixel data is subjected to a discrete cosine transform (DCT) operation. Varying levels of sub-blocks of resulting corresponding transform coefficients are selected for construction into a composite transform coefficient block corresponding to each input block of pixel data. The selection of transform coefficient block size for the composite block is determined by a comparison process between transform block and sub-block coding efficiency. The composite block is variable length coded to further reduce bit count in the compressed data.

47 Claims, 7 Drawing Sheets

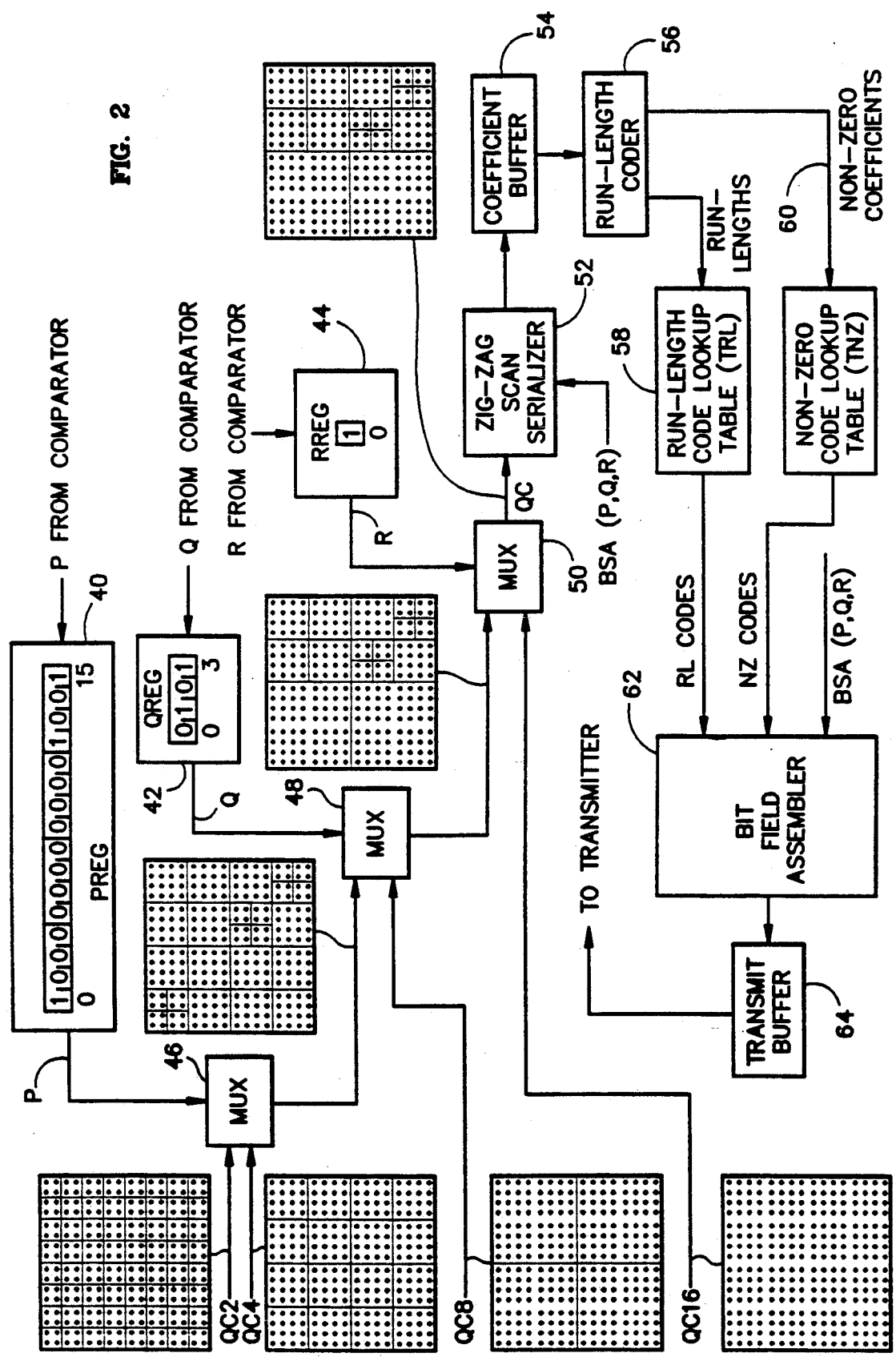

ADAPTIVE BLOCK SIZE IMAGE COMPRESSION METHOD AND SYSTEM

This is a continuation of application Ser. No. 07/487,012, now U.S. Pat. No. 5,021,891 filed Feb. 27, 1990.

1. Field of the Invention

The present invention relates to image processing. More to particularly, the present invention relates to a novel and improved image signal compression scheme utilizing adaptively sized blocks and sub-blocks of encoded discrete cosine transform (DCT) coefficient data.

2. Description of the Related Art

In the field transmission and reception of television signals, various improvements are being made to the NTSC (National Television Systems Committee) System. Developments in the field of television are commonly directed towards a high definition television (HDTV) System. In the development of HDTV, system developers have merely applied the Nyquist sampling theorem and low pass filtering design with varying degrees of success. Modulation in these systems amounts to nothing more than a simple mapping of an analog quantity to a value of signal amplitude or frequency.

It has most recently been recognized that it is possible to achieve further improvements in HDTV systems by using digital techniques. Many of the proposed HDTV transmission formats share common factors. These systems all involve digital processing of the video signal, which necessitates analog-to-digital (A/D) conversion of the video signal. An analog transmission format is then used thereby necessitating conversion of the digitally processed picture back to analog form for transmission.

The receiver/processor must then reverse the process in order to provide image display. The received analog signal is therefor digitized, stored, processed and reconstructed into a signal according to the interface format used between the receiver/processor and the HDTV display. Furthermore the signal is most likely converted back to analog form once more for display. It is noted however that the proposed HDTV formats utilize digital transmission for transmission of control, audio and authorization signals.

Many of the conversion operations mentioned above, however, may be avoided using a digital transmission format which transmits the processed picture, along with control, audio and authorization signals, using digital modulation techniques. The receiver may then be configured as a digital modem with digital outputs to the video processor function. Of course, the modem requires an A/D function as part of operation, but this implementation may only require a 4-bit resolution device rather than the 8-bit resolution device required by analog format receivers.

Digital transmission is superior to analog transmission in many ways. Digital transmissions provide efficient use of power which is particularly important to satellite transmission and in military applications. Digital transmissions also provide a robustness of the communications link to impairments such as multipath and jamming. Furthermore digital transmission facilitates ease in signal encryption, necessary for military and many broadcast applications.

Digital transmission formats have been avoided in previous HDTV system proposals primarily because of the incorrect belief that they inherently require excessive bandwidth. Therefore in order to realize the benefits of digital transmission, it is necessary to substantially compress the HDTV signal. HDTV signal compression must therefor be achieved to a level that enables transmission at bandwidths comparable to that required by analog transmission formats. Such levels of signal compression coupled with digital transmission of the signal will enable a HDTV system to operate on less power with greater immunity to channel impairments.

It is therefore an object of the present invention to provide a novel and improved method and system for compressing HDTV signals that will enable digital transmission at bandwidths comparable to that of analog transmissions of conventional TV signals.

SUMMARY OF THE INVENTION

The present invention is a novel and improved system and method for compressing image data for transmission and for reconstruction of the image data upon reception. The image compression system includes a sub-system for generating from a block of input pixel data a corresponding composite block of discrete cosine transform data optimized for encoding for a minimized transmission data rate.

The sub-system of the present invention comprises transform means for receiving an input block of pixel data and for performing a discrete cosine transform (DCT) operation on the block of pixel data and on at least one predetermined level of constituent sub-blocks thereof. The transform means provides an output of corresponding block and sub-blocks of DCT coefficient values.

Block size assignment means is included in the sub-system for receiving the block and each sub-block of DCT coefficient values and for determining for the block and each corresponding group of constituent sub-blocks of DCT coefficient values a bit count value corresponding to a number of bits required to respectively encode the block and each corresponding group of constituent sub-blocks of DCT coefficient values according to a predetermined coding format. The block assignment means is further for determining from the bit count values ones of the block and group of constituent sub-blocks of DCT coefficient values requiring a lesser number of bits to encode according to the coding format, and providing an output of a corresponding selection value.

The sub-system further includes selection means for receiving the selection value and the block and each sub-block of DCT coefficient values and for selecting ones of block and sub-blocks of DCT coefficient values corresponding to the selection value. The selection means provides an output of a corresponding composite block of DCT coefficient values formed from the selected ones of block and sub-locks of DCT coefficient values.

The system embodying the sub-system further comprises ordering means for receiving the composite block of DCT coefficient values and ordering the composite block of coefficient values according to a predetermined ordering format. The ordering means provides an output of the ordered DCT coefficient values.

The ordered DCT coefficient values output from the ordering means are received by an encoder means that codes the ordered DCT coefficient values according to the predetermined coding format. The encoder means provides an output of the coded ordered DCT coefficient values.

The coded values are received by an assembler means which also receives the selection value provided by the selection means. The assembler means combines the selection value and the coded values as a coded image value representative of the input block of pixel data. The coded image value is of a reduced bit count with respect to a bit count of the input block of pixel data. The assembler means provides an output of the coded image value for transmission.

The present invention also provides for a novel and improved method for reconstructing from each received coded image value corresponding a block pixel of pixel data. The present invention further envisions a novel and improved method for compressing an image signal as represented by a block of pixel data and for reconstructing the image signal from the compressed image signal.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 2 is a block diagram illustrating the processing elements for selecting block sizes of DCT coefficient data so as to generate a composite block of DCT coefficient data and the encoding of the composite block for transmission;

FIGS. 4a and 4b are graphs respectively illustrating in graphical form the selected block zig-zag scan serialization ordering sequence within the sub-blocks and between sub-blocks for an exemplary composite block of DCT coefficient data whose block size selection was made according to the block size assignment data of FIG. 3a;

DETAILED DESCRIPTION OF THE PREFERRED EMBODIMENTS

Figure 1:
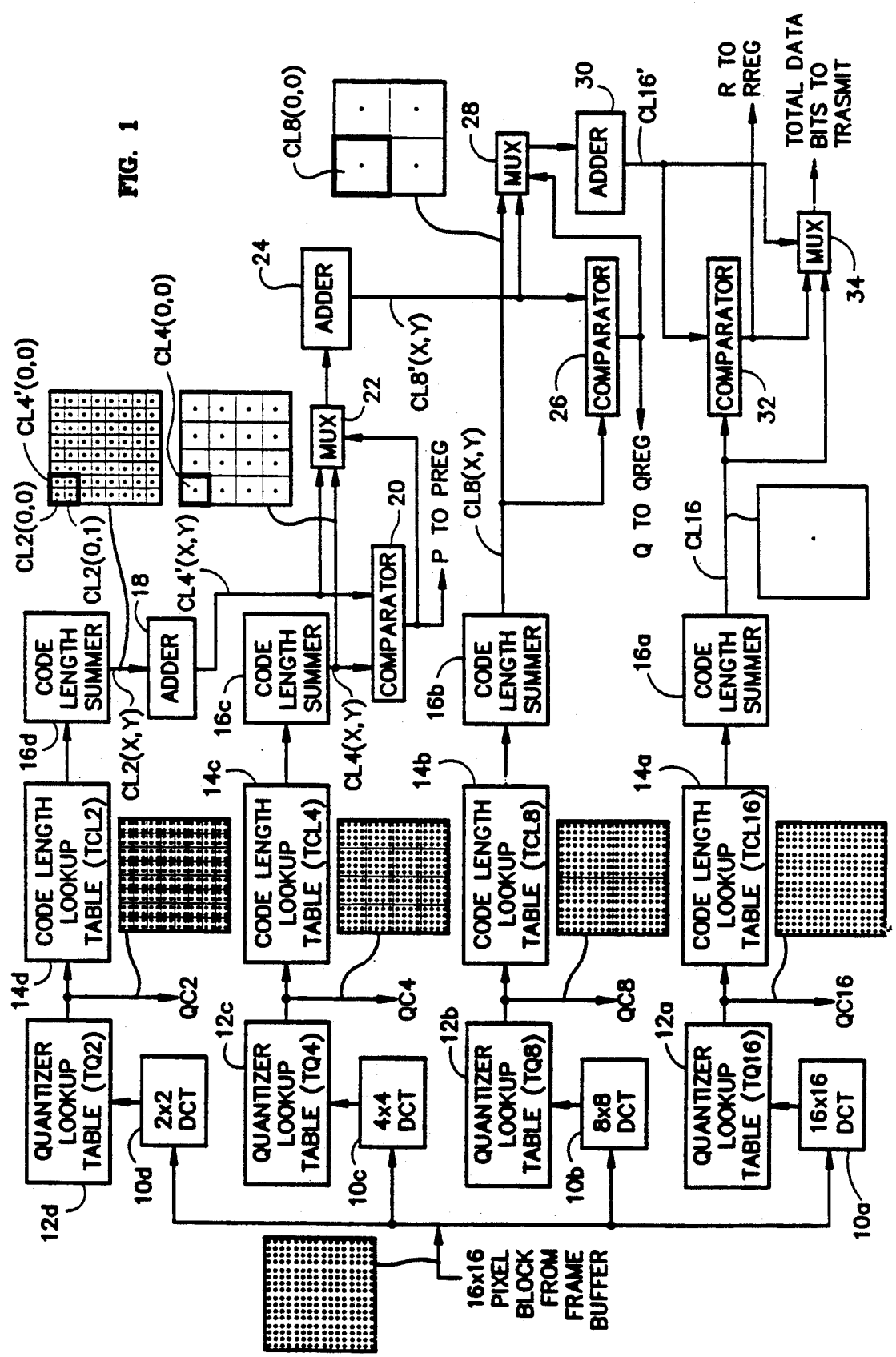
FIG. 1 is a block diagram illustrating the processing elements of the adaptive block size image compression system for providing DCT coefficient data and block size determination.

In order to facilitate digital transmission of HDTV signals and enjoy the benefits thereof, it is necessary to employ some form of signal compression. In order to achieve such high definition in the resulting image, it is also important that high the quality of the image also be maintained. The discrete cosine transform (DCT) techniques have been shown to achieve a very high compression. One such article which illustrates the compression factor is that entitled "Scene Adaptive Coder" by Wen-Hsiung Chen et al., *IEEE Transactions on Communications*, Vol. Com-32, No. 3, March, 1984. However, the quality of reconstructed pictures is marginal even for video conferencing applications.

With respect to the DCT coding techniques, the image is composed of pixel data which is divided into an array of non-overlapping blocks, N×N in size. Strictly for black and white television images each pixel is represented by an 8-bit word whereas for color television each pixel may be represented by a word comprised of up to 24-bits. The blocks in which the image is divided up to is typically a 16×16 pixel block, i.e., N+16. A two-dimensional N×N DCT is performed in each block. Since DCT is a separable unitary transformation, a two-dimensional DCT is performed typically by two successive one-dimensional DCT operations which can result in computational savings. The one-dimensional DCT is defined by the following equation:

$$X(k) = \frac{2C(k)}{N} \sum_{n=o}^{N-1} x(n)\cos\frac{\pi(2n+1)k}{2N} \quad (1)$$

where $C(0) = \frac{1}{\sqrt{2}}$ ;

and
$C(k) = 1$ for $k = 1, 2, 3, \ldots N - 1$.

For television images, the pixel values are real so that the computation does not involve complex arithmetic. Furthermore, pixel values are non-negative so that the DCT component, X(0), is always positive and usually has the most energy. In fact, for typical images, most of the transform energy is concentrated around DC. This energy compaction property makes the DCT such an attractive coding method.

It has been shown in the literature that the DCT approaches the performance of the optimum Karhunen-Loeve Transform (KLT), as evidenced by the article entitled "Discrete Cosine Transform" by N. Ahmed et al., *IEEE Transactions on Computers*, January 1974, pages 90–93. Basically, the DCT coding performs a spatial redundancy reduction on each block by discarding frequency components that have little energy, and by assigning variable numbers of bits to the remaining DCT coefficients depending upon the energy content. A number of techniques exist that quantize and allocate bits to minimize some error criterion such as MSE over the block. Typically the quantized DCT coefficients are mapped into a one-dimensional string by ordering from low frequency to high frequency. The mapping is done according to diagonal zig-zag mapping over the block of DCT coefficients. The locations of the zero (or discarded) coefficients are then coded by a run-length coding technique.

In order to optimally quantize the DCT coefficient, one needs to know the statistics of the transform coefficients. Optimum or sub-optimal quantizers can be designed based on the theoretical or measured statistics that minimize the over-all quantization error. While there is not complete agreement on what the correct statistics are, various quantization schemes may be utilized, such as that disclosed in "Distribution of the Two-Dimensional DCT Coefficients for Images" by Randall C. Reininger et al., *IEEE Transactions on Communications*, Vol. 31, No. 6, June 1983, Pages 835–839.

However, even a simple linear quantizer has been utilized which has provided good results.

Aside from deciding on a quantization scheme, there are two other methods to consider in order to produce the desired bit rate. One method is to threshold the DCT coefficient so that the small values are discarded and set to zero. The other technique is to linearly scale (or normalize) the coefficients to reduce the dynamic range of the coefficients after floating point to integer conversion for coding. Scaling is believed to be superior to thresholding in retaining both the subjective as well as objective signal to noise ratio quality. Therefore the main variable in the quantization process will be the coefficient scale factor which can be varied to obtain the desired bit rate.

The quantized coefficients usually are coded by Huffman codes distribution. Most of the coefficients are concentrated around the low values so that Huffman coding gives good results. It is believed that Huffman codes generated from a measured histogram performs very close to theoretical limits set by the entropy measure. The location of the zero coefficients are coded by run-length codes. Because the coefficients are ordered from low to high frequencies, the runs tend to be long such that there is a small number of runs. However, if the number of runs in terms of length were counted, the short runs dominate so that Huffman coding the run-lengths reduces the bit rate even more.

An important issue that concerns all low bit-rate compression schemes is the effect of channel bit error on the reconstruction quality. For DCT coding, the lower frequency coefficients are more vulnerable, especially the DC term. The effect of the bit error rate (BER) on the reconstruction quality at various compression rates has been presented in the literature. Such issues are discussed in the article entitled "Intraframe Cosine Transfer Image Coding" by John A. Roese et al., *IEEE Transactions on Communications*, Vol. Com-25, No. 11, November 1977, Pages 1329-1339. The effect of BER becomes noticeable around $10^{-3}$ and it becomes significant at $10^{-2}$. A BER of $10^{-5}$ for the transmission sub-system would be very conservative. If necessary, a scheme can be devised to provide additional protection for lower frequency coefficients, such as illustrated in the article "Hamming Coding of DCT-Compressed Images over Noisy Channels" by David R. Comstock et al., *IEEE Transactions on Communications*, Vol. Com-32, No. 7, July 1984, Pages 856-861.

It has been observed that most natural images are made up of blank relatively slow varying areas, and busy areas such as object boundaries and high-contrast texture. Scene adaptive coding schemes take advantage of this factor by assigning more bits to the busy area and less bits to the blank area. For DCT coding this adaptation can be made by measuring the busyness in each transform block and then adjusting the quantization and bit allocation from block to block. The article entitled "Adaptive Coding of Monochrome and Color images" by Wen-Hsiung Chen et al., *IEEE Transactions on Communications*, Vol. Com-25, No. 11, November 1977, Pages 1285-1292, discloses a method where block energy is measured with each block classified into one of four classes. The bit allocation matrix is computed iteratively for each class by examining the variance of the transform samples. Each coefficient is scaled so the desired number of bits result after quantization. The overhead information that must be sent are the classification code, the normalization for each block, and four bit allocation matrices. Utilization of this method has produced acceptable results at 1 and 0.5 bits per pixel.

Further bit rate reduction was achieved by Chen et al in the previously mentioned article "Scene Adaptive Coder" where a channel buffer is utilized to adaptively scale and quantize the coefficients. When the buffer becomes more than half full, a feedback parameter normalizes and quantizes the coefficients coarsely to reduce the bits entering the buffer. The converse happens when the buffer becomes less than half full. Instead of transmitting the bit allocation matrices, they run-length code the coefficient locations and Huffman code the coefficients as well as the run-lengths. Such an implementation has shown good color image reconstructions at 0.4 bits per pixel. Although these results look very good when printed, the simulation of the system shows many deficiencies. When images are viewed under normal to moderate magnification smoothing and blocking effects are visible. In the present invention, intraframe coding (two-dimensional processing) is utilized over interframe coding (three-dimensional processing). One reason for the adoption of intraframe coding is the complexity of the receiver required to process interframe coding signals. Interframe coding inherently require multiple frame buffers in addition to more complex processing circuits. While in commercialized systems there may only be a small number of transmitters which contain very complicated hardware, the receivers must be kept as simple as possible for mass production purposes.

The second most important reason for using intraframe coding is that a situation, or program material, may exist that can make a three-dimensional coding scheme break down and perform poorly, or at least no better than the intraframe coding scheme. For example, 24 frame per second movies can easily fall into this category since the integration time, due to the mechanical shutter, is relatively short. This short integration time allows a higher degree of temporal aliasing than in TV cameras for rapid motion. The assumption of frame to frame correlation breaks down for rapid motion as it becomes jerky. Practical consideration of frame to frame registration error, which is already noticeable on home videos become worse at higher resolution.

An additional reason for using intraframe coding is that a three-dimensional coding scheme is more difficult to standardize when both 50 Hz and 60 Hz power line frequencies are involved. The use of an intraframe scheme, being a digital approach, can adapt to both 50 Hz and 60 Hz operation, or even to 24 frame per second movies by trading off frame rate versus spatial resolution without inducing problems of standards conversion.

Although the present invention is described primarily with respect to black and white, the overhead for coding color information is surprisingly small, on the order of 10 to 15% of the bits needed for the luminance. Because of the low spatial sensitivity of the eye to color, most researchers have converted a color picture from RGB space to YIQ space, sub-sample the I and Q components by a factor of four in horizontal and vertical direction. The resulting I and Q components are coded similarly as Y (luminance). This technique requires 6.25% overhead each for the I and Q components. In practice, the coded Q component requires even less data than the I component. It is envisioned that no significant loss in color fidelity will result when utilizing this class of color coding techniques.

In the implementation of DCT coding techniques, the blocking effect is the single most important impairment to image quality. However, it has been realized that the blocking effect is reduced when a smaller sized DCT is used. The blocking effect becomes virtually invisible when a 2×2 DCT is used. However, when using the small-sized DCT, the bit per pixel performance suffers somewhat. However, a small-sized DCT helps the most around sharp edges that separate relatively blank area. A sharp edge is equivalent to a step signal which has significant components at all frequencies. When quantized, some of the low energy coefficients are truncated to zero. This quantization error spreads over the block. This effect is similar to a two-dimensional equivalent of the Gibbs phenomenon, i.e. the ringing present around a step pulse signal when part of the high frequency components are removed in the reconstruction process. When adjacent blocks do not exhibit similar quantization error, the block with this form of error stands out and creates the blocking effect. Therefore by using smaller DCT block sizes the quantization error becomes confined to the area near the edge since the error cannot propagate outside the block. Thereby, by using the smaller DCT block sizes in the busy areas, such as at edges, the error is confined to the area along the edge. Furthermore, the use of the small DCT block sizes is further enhanced with respect to subjective quality of the image due to the spatial masking phenomena in the eye that hides noise near busy areas.

The adaptive block size DCT technique implemented in the present invention may be simply described as a compare-and-replace scheme. A 16×16 pixel data array or block of the image is coded as in the fixed block size DCT techniques, however, sub-block sizes of 16×16, 8×8, 4×4 and 2×2 are used. For each 4×4 block, the number of bits to code the block by using four 2×2 sub-blocks inside the 4×4 block is examined. If the sum of the four 2×2 sub-blocks is smaller than the bits needed to code it as a 4×4 block, the 4×4 block is replaced by four 2×2 sub-blocks. Next, each of the 8×8 blocks are examined to determine if they can in turn be replaced by four 4×4 sub-blocks which were optimized in the previous stage. Similarly, the 16×16 block is examined to determine if it can be replaced by four 8×8 sub-blocks that were optimized in the previous stage. At each stage the optimum block/sub-block size is chosen so that the resulting block size assignment is optimized for the 16×16 block.

Since 8-bits are used to code the DC coeffcients regardless of the block size, utilization of small blocks results in a larger bit count. For this reason, 2×2 blocks are used only when their use can lower the bit count. The resulting sub-block structure can be conveniently represented by an inverted quadtree (as opposed to a binary tree), where the root corresponding to the 16×16 block in each node has four possible branches corresponding to four sub-blocks. An example of a possible inverted quadtree structure is illustrated in FIG. 3b.

Each decision to replace a block with smaller sub-blocks requires one bit of information as overhead. This overhead ranges from one bit for a 16×16 block up to 21 bits (1+4+16) when 4×4 and 2×2 sub-blocks are used everywhere within in the 16×16 block. This overhead is also incorporated into the decision making process to ensure that the adaptive block size DCT scheme always uses the least number of bits to code each 16×16 block.

Although block sizes discussed herein as being N×N in size, it is envisioned that various block sizes may be used. For example an N×M block size may be utilized where both N and M are integers with M being either greater than or lesser than N. Another important aspect is that the block is divisible into at least one level of sub-blocks, such as N/i×N/i, N/i×N/j, N/i×M/j, and etc. where i and j are integers. Furthermore, the exemplary block size as discussed herein is a 16×16 pixel block with corresponding block and sub-blocks of DCT coefficients. It is further envisioned that various other integer such as both even or odd integer values may be used, e.g. 9×9.

Due to the importance of these overhead bits for the quadtree, these bits need to be protected particularly well against channel errors. One can either provide an extra error correction coding for these important bits or provide and error recovery mechanism so that the effect of channel errors is confined to a small area of the picture.

The adaptive block size DCT compression scheme of the present invention can be classified as an intraframe coding technique, where each frame of the image sequence is encoded independently. Accordingly, a single frame still picture can be encoded just as easily without modification. The input image frame is divided into a number of 16×16 pixel data blocks with encoding performed for each block. The main distinction of the compression scheme of the present invention resides in the fact that the 16×16 block is adaptively divided into sub-blocks with the resulting sub-blocks at different sizes also encoded using a DCT process. By properly choosing the block sizes based on the local image characteristics, much of the quantization error can be confined to small sub-blocks. Accordingly small sub-blocks naturally line up along the busy area of the image where the perceptual visibility of the noise is lower than in blank areas.

In review, a conventional or fixed block size DCT coding assigns a fixed number of bits to each block such that any quantanization noise is confined and distributed within the block. When the severity or the characteristics of the noise between adjacent blocks are different, the boundary between the blocks become visible with the effect commonly known as a blocking artifact. Scene adaptive DCT coding assigns a variable number of bits to each block thereby shifting the noise between fixed sized blocks. However, the block size is still large enough, usually 16×16, such that some blocks contain both blank and busy parts of the image. Hence the blocking artifact is still visible along image detail such as lines and edges. Using smaller block sizes such as 8×8 or 4×4 can greatly reduce the blocking artifact, however, at the expense of a higher data rate. As a result the coding efficiency of DCT drops as the block size gets smaller.

The present invention implements an adaptive block size DCT technique which optimally chooses block size such that smaller blocks are used only when they are needed. As a result, the blocking artifact is greatly reduced without increasing the data rate. Although a number of different methods can be devised that determine block size assignment, an exemplary illustration of an embodiment is provided which assigns block sizes such that the total number of bits produced for each block is minimized.

FIGS. 1 and 2 illustrate an exemplary implementation of the adaptive block size DCT transform image signal compression scheme for converting N×N pixel data blocks into whole bit coded data. As discussed herein for purposes of illustration N=16. FIG. 1 illustrates the implementation of the DCT transform and block size determination elements. FIG. 2 illustrates the DCT coefficient data block selection according to the block size determination along with composite DCT coefficient data block bit coding.

In FIG. 1, an image signal as represented by a 16×16 block of digitized pixel data is received from the frame buffer (not shown). The pixel data may be either 8 bit black and white image data or 24 bit color image data. The 16×16 pixel block is input to a 16×16 two-dimensional discrete cosine transform (DCT) element 10a. The 16×16 pixel block is also input as four 8×8 pixel blocks to 8×8 DCT element 10b, as eight 4×4 pixel blocks to 4×4 DCT element 10c, and as sixty-four 2×2 pixel blocks to 2×2 DCT element 10d. DCT elements 10a-10d may be constructed in integrated circuit form as is well known in the art.

DCT elements 10a-10d perform two-dimensional DCT operations on each respectively sized input block of pixel data. For example, DCT element 10a performs a single 16×16 transform operation, DCT element 10b performs four 8×8 DCT operations, DCT element 10c performs sixteen 4×4 DCT operations, while DCT element 10d performs sixty-four 2×2 DCT operations. Transform coefficients are output from each DCT element 10a-10d to a respective quantizer look up table 12a-12d.

Quantizer lookup tables 12a-12d may be implemented in conventional read only memory (ROM) form with memory locations containing quantization values. The value of each transform coefficient is used to address a corresponding memory location to provide an output data signal indicative of a corresponding quantized transform coefficient value. The output of quantizer lookup table 12a, indicated by the reference signal QC16, is a 16×16 block of quantized DCT coefficient values. The output of quantizer lookup table 12b, indicated by the reference signal QC8, is comprised of a data block of four 8×8 sub-blocks of quantized DCT coefficient values. The output of quantizer lookup table 12c, indicated by the reference signal QC4, is comprised of a data block of sixteen 4×4 sub-blocks of quantized DCT coefficient values. And finally, the output of quantizer lookup table 12d, indicated by the reference signal QC2, is comprised of a data block of sixty-four 2×2 sub-blocks of quantized DCT coefficient. Although not illustrated, the DC (lowest frequency) coefficients of each transform may be optionally treated separately rather than directly through the corresponding quantizer lookup table.

The outputs of quantizer lookup tables 12a-12d are respectively input to code length lookup tables 14a-14d. The quantized DCT coefficient values are each coded using variable length code, such as a Huffman code, in order to minimize the data rate. Code words and corresponding code lengths are found in the form of code length look up tables 14a-14d. Each of the quantized DCT coefficients QC2, QC4, QC8, and QC16 are used to look up in the code length tables the corresponding number of bits required to code each coefficient. Code length lookup tables 14a-14d may be implemented in read only memory form with the DCT coefficients addressing memory locations which contain respective code length values.

The number of bits required to code each block or sub-block is then determined by summing the code lengths in each block and sub-block. The output of 256 code length values from code length lookup table 14a is provided to code length summer 16a which sums all 256 code lengths for the 16×16 block. The output from code length summer 16a is the signal CL16, a single value indicative of the number of bits required to code the 16×16 block of quantized DCT coefficients. The 256 code length values output from code length lookup table 14b is provided to code length summer 16b. In code length summer 16b the number of bits required to code each 8×8 DCT coefficient sub-block is determined by summing the code length in each 8×8 sub-block. The output of code length summer 16b is four values indicated by the reference signal CL8 with each value being the sum of sixty-four code lengths in each of the four 8×8 blocks. Similarly, code length summer 16c is used to sum the code length in each of the 4×4 sub-blocks as output from code length lookup table 14c. The output of code length summer is 16c sixteen values indicated by the reference signal CL4 with each value being the sum of the sixteen code lengths in each of the sixteen 4×4 sub-blocks. Code length summer 16d is similarly used in determining the number of bits necessary to code each 2×2 sub-block as output from code length lookup table 14d. Code length summer 16d provides sixty-four output values indicated by the reference signal CL2 with each value being the sum of the four code lengths in a respective one of the sixty-four 2×2 blocks. The values CL8, CL4, and CL2 are also identified with block position orientation indicia for discussion later herein. The position indicia is a simple x-y coordinate system with the position indicated by the subscript (x,y) associated with the values CL8, CL4, and CL2.

The block size assignment (BSA) is determined by examining values of CL2, CL4, CL8 and CL16. Four neighboring entries of $CL2_{(x,y)}$ are added and the sum is compared with the corresponding entry in $CL4_{(x,y)}$. The output of $CL2_{(x,y)}$ from code length summer 16d is input to adder 18 which adds the four neighboring entries and provides a sum value $CL4'_{(x,y)}$. For example, the values representative of blocks $CL2_{(0,0)}$, $CL2_{(0,1)}$, $CL2_{(1,0)}$, and $CL2_{(1,1)}$ are added to provide the value $CL4'_{(0,0)}$. The value output from adder 18 is the value $CL4'_{(x,y)}$ which is compared with the value $CL4_{(x,y)}$ output from code length summer 16c. The value $CL4'_{(x,y)}$ is input to comparator 20 along with the value $CL4_{(x,y)}$. Comparator 20 compares the corresponding input values from adder 18 and code length summer 16c so as to provides a bit value, P, that is output to a P register (FIG. 2) and as a select input to multiplexer 22. In the example as illustrated in FIG. 1, the value $CL4'_{(0,0)}$ is compared with the value $CL4_{(0,0)}$. If the value $CL4_{(x,y)}$ is greater than the summed values of $CL4'_{(x,y)}$, comparator 20 generates a logical one bit, "1", that is entered into the P register. The "1" bit indicates that a corresponding 4×4 block of DCT coefficients can be coded more efficiently using four 2×2 sub-blocks. If not, a logical zero bit, "0", is entered into the P register, indicating that the 4×4 block is coded more efficiently using the corresponding 4×4 block.

The output of code length summer 16c and adder 18 are also provided as data inputs to multiplexer 22. In response to the "1" bit value output from comparator 20, multiplexer 22 enables the $CL4'_{(x,y)}$ value to be output therefrom to adder 24. However should the comparison result in a "0" bit value being generated by comparator 20, multiplexer 22 enables the output $CL4_{(x,y)}$ from code length summer 16c to be input to adder 24. Adder 24 is used to sum the data input therefrom, as selected from the comparisons of the values of $CL4_{(x,y)}$ and $CL4'_{(x,y)}$. The result of four comparisons of the $CL4_{(x,y)}$ and the $CL4'_{(x,y)}$ data is added in adder 24 to generate a corresponding $CL8'_{(x,y)}$ value. For each of the sixteen comparisons of the $CL4_{(x,y)}$ and $CL4'_{(x,y)}$ values, the comparison result bit is sent to the P register.

The next stage in the determination of block size assignment is similar to that discussed with respect to the generation and comparison of the values CL4 and CL4'. The output of $CL8'_{(x,y)}$ is provided as an input to comparator 26 along with the output $CL8_{(x,y)}$ from code length summer 16b. If the corresponding entry in $CL8_{(x,y)}$ is greater than the summed value $CL8'_{(x,y)}$, comparator 26 generates a "1" bit which is output to the Q register (FIG. 2). The output of comparator 26 is also provided as a selected input to multiplexer 28 which also receives the values $CL8_{(x,y)}$ and $CL8'_{(x,y)}$ respectively from code length summer 16b and adder 24. Should the value output from comparator 26b a "1" bit, the $CL8'_{(x,y)}$ value is output from multiplexer 28 to adder 30. However, should the value $CL8'_{(x,y)}$ be greater than the value $CL8_{(x,y)}$, comparator 26 generates a "0" bit that is sent to the Q register and also to the select input of multiplexer 28. Accordingly, the value $CL8_{(x,y)}$ is then input to adder 30 via multiplexer 28. Comparison results of comparator 26 are the Q values sent to the Q register. Again a "1" bit indicates that the corresponding 8×8 block of DCT coefficients may be more efficiently coded by smaller blocks such as all 4×4 blocks, all 2×2 blocks or a combination thereof as optimally determined by the smaller block comparisons. A "0" bit indicates that the corresponding 8×8 block of DCT coefficients can be more efficiently coded than any combination of smaller blocks.

The values input to adder 30 are summed and provided as an output value CL16' input to comparator 32. A second input is provided to comparator 32 as the value CL16 output from by code length summer 16a. Comparator 32 preforms a single comparison of the value CL16 and CL'16. Should the value CL16 be greater than the value CL16' a "1" bit is entered into the R register (FIG. 3). A "1" bit input to the R register is indicative that the block may be coded more efficiently using sub-blocks rather than a single 16×16 block. However should the value CL16' be greater than the value CL16, comparator 32 outputs a "0" bit to the R register. The "0" bit in the R register is indicative that the block of DCT coefficients may be coded more efficiently as a 16×16 block.

Comparator 32 is also provides the output R bit as a select input to multiplexer 34. Multiplexer 34 also has inputs for receiving the CL16 and CL16' values respectively provided from code length summer 16a and adder 30. The output from multiplexer 34 is the value CL16 should the R output bit be a "0" while the value CL16' is output should the R output bit be a "1". The output of multiplexer 34 is a value indicative of the total bits to be transmitted.

It should be noted that the overhead bits vary from one bit to up to twenty-one bits (1+4+16) when 4×4 and 2×2 blocks are used everywhere within the 16×16 block.

In FIG. 2, the P value output from comparator 20 (FIG. 1) is input serially to a sixteen-bit register, P register 40. Similarly, the output from comparator 26 is input serially to a four-bit register, Q register 42. Finally, the output from comparator 32 is input serially to a one-bit register, R register 44. The output from P register 40 is provided as a P output to the select input of multiplexer 46. Multiplexer 46 also has inputs as the QC2 and QC4 values respectively output from Quantizer lookup tables 12d and 12c. The output of multiplexer 46 is provided as an input to multiplexer 48, which also has as a second input for the QC8 values as output from quantizer lookup table 12b. A select input to multiplexer 48 is provided from the output of Q register 42. The output of multiplexer 48 is coupled as one input to multiplexer 50. The other input of multiplexer 50 is coupled to the output of quantizer lookup table 12a for receiving the values QC16. The select input of multiplexer 50 is coupled to the output of R register 44 so as to receive the output bit R.

As illustrated in FIG. 2, P register 40 includes a sequence of bit positions, 0–15, with corresponding bit values as determined by the comparison process as discussed with reference to FIG. 1. Similarly Q register 42 and R register 44 respectively have bit position 0–3 and 0 with corresponding data as determined with reference to FIG. 1. The data in the P, Q and R registers as illustrated in FIG. 2 is merely for the purpose of illustration.

As illustrated in FIG. 2, the value of P register 40 bit is used to select via multiplexer 46, QC2 data (four 2×2 blocks of quantized transform coefficients) or the corresponding QC4 data (a 4×4 block of quantized transform coefficients). Multiplexer 48, in response to the value of the bit output from Q register 42 selects between the output of multiplexer 46 and the value QC8 data. When the Q register bit value is a "1" bit, the output of multiplexer 46 as input to multiplexer 48 is selected for output of multiplexer 48. When the Q register bit value is a "0" bit, the output of multiplexer 48 is the QC8 value. Therefore, the output bit value of Q register 42 is used to select between four QC4 blocks or sub-blocks of QC2 values as output from multiplexer 46 or a corresponding single 8×8 block. As illustrated in FIG. 2, the four upper left hand blocks as output from multiplexer 46 include four 2×2 blocks with three neighboring 4×4 blocks. However with the bit of the Q register being a "0" bit, multiplexer 48 selects the 8×8 block as an output. This example illustrates the conditional replacement scheme.

The output of multiplexer 48 is coupled as an input to multiplexer 50. The other input of multiplexer 50 is provided with the Q16 data, the 16×16 block of quantized DCT coefficients as provided from quantizer lookup table 12a. The select input to multiplexer 50 is the output bit of the R register. In the example illustrated in FIG. 2, the bit output from R register 44 is a "1" bit thus selecting data as output from multiplexer 50 that which was provided from multiplexer 48. Should the R register 44 output bit value be a "0" bit, multiplexer 50 would output the QC16 data.

The multiplexing scheme as illustrated in FIG. 2 utilizes the block assignments to multiplex coefficient sub-blocks QC2, QC4, QC8, QC16 values into a composite block of DCT coefficients QC. In essence this step is accomplished by three stages. The first stage conditionally replaces a 4×4 block of QC4 with four 2×2 sub-blocks according to the content of the P register. The second stage conditionally replaces an 8×8 block of QC8 by four 4×4 sub-blocks as resulting from the previous stage according to the content of the Q register. The third stage conditionally replaces the 16×16 block of QC16 by the result of the previous stages if the R register contains a "1" bit.

Figure 3A:
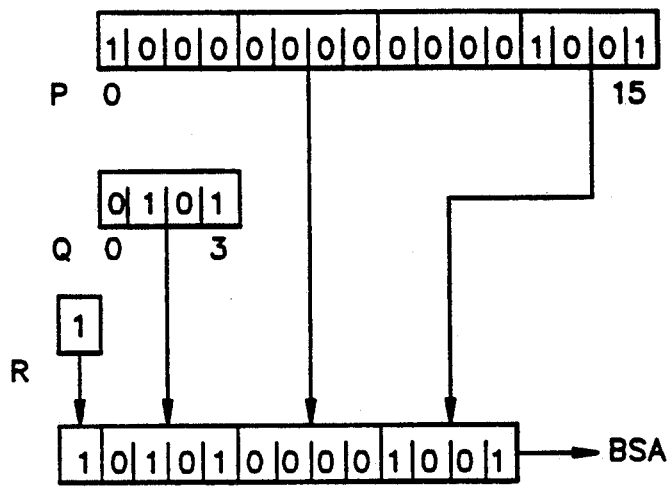
FIGS. 3a and 3b respectively illustrate exemplarily register block size assignment data and the block selection tree corresponding thereto.
Figure 3B:
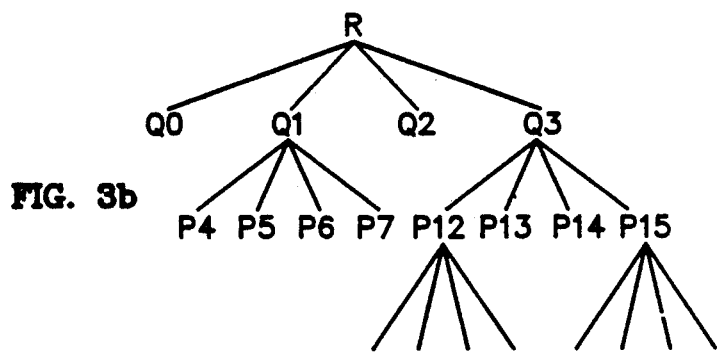

FIGS. 3a and 3b respectively illustrate the exemplary P, Q and R register data and corresponding BSA bit pattern and corresponding inverted quadtree corresponding thereto. The level of hierarchy involved is that should the bit stored in the R register be a "1", a condition exists which is indicative that the image block may be more efficiently coded using smaller blocks. Similarly, should the Q register contain any "1" bits it further indicates that the corresponding 8×8 block may be more efficiently coded by smaller blocks. Similarly, should the P register contain any "1" bits it further indicates that the corresponding 4×4 block may be more efficiently coded using four 2×2 blocks. Should any of the registers contain a "0" bit, this indicates that the block or sub-block may be coded more efficiently by using the size block related thereto. For example, the value of the bit in the P register bit 0 position, a "1" bit, indicates that this 4×4 block may be more efficiently coded using four 2×2 blocks while the "0" bits in the P register bit positions 1-3 indicate that the three 4×4 blocks are more efficiently coded than using corresponding 2×2 blocks. However, the bit value "0" in the Q register bit 0 position indicates that the four 4×4 blocks (comprised of one group of four 2×2 blocks and three 4×4 blocks) may be more efficiently coded by a single 8×8 block. Therefore, the Q register data would override the P register data. Once the P register data was overridden by the Q register 0 position bit, data in the P register bit positions 0-3, need not be transmitted as part of the block size assignment (BSA) data. However, should a bit position in a higher register be a "1" bit, such as bit position 1 of the Q register, the corresponding P register bits are provided as part of the block size assignment data. As illustrated in FIG. 3a, the Q register bit 1 position is a "1" bit and therefore the corresponding P register bits 4–7 are provided in the BSA data. On a higher level, since the R register bit is a "1" bit each of the Q register bits are provided in the BSA data.

Returning to FIG. 2, the composite block QC contains many zero coefficient values which can be more efficiently coded by run-length codes. The number of consecutive zeros or runs are sent instead of the code words for each zero. In order to maximize the efficiency of the run-length coding, the coefficients are ordered in a predetermined manner such that the occurrence of short runs is minimized. Minimization is done by encoding the coefficients which are likely to be non-zeros first, and the encoding the coefficients that are more likely to be zeros last. Because of the energy compaction property of DCT towards low frequency, and because diagonal details occur less often than horizontal or vertical details, diagonal scan or zig-zag scan of the coefficients is preferred. However, because of the variable block sizes used, the zig-zag scan has to be modified to pick out the low frequency components from each sub-block first, but at the same time follow the diagonal scanning for coefficients of similar frequency, technically when the sum of the two frequency indices are the same.

Figure 4A:
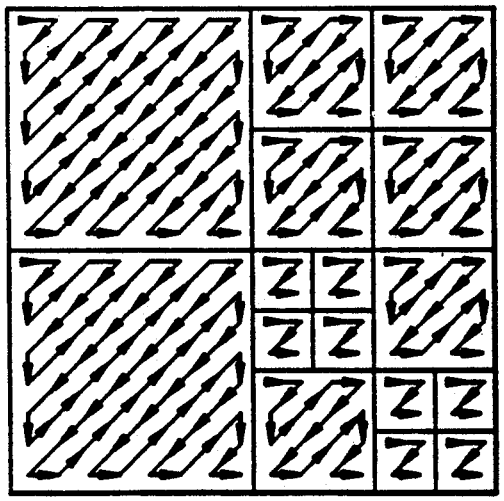
Figure 4B:
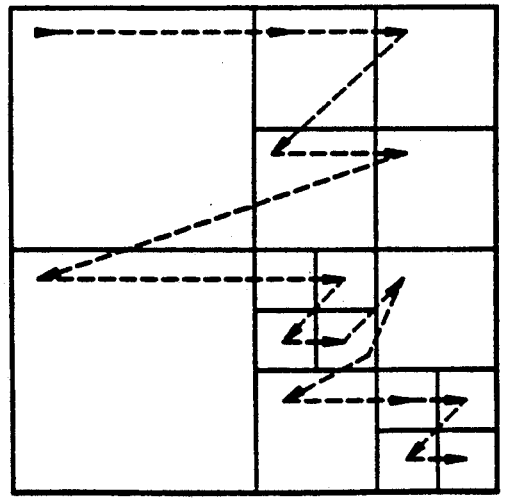
Figure 5A:
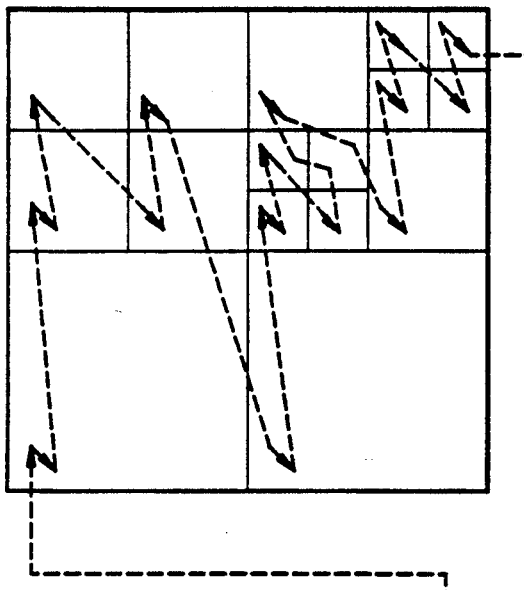
FIGS. 5a –5d respectively illustrate in graphical form an alternate zig-zag scan serialization format.
Figure 5B:
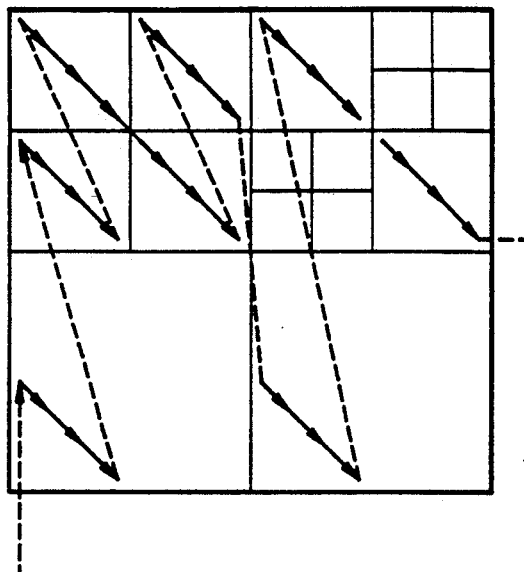
Figure 5C:
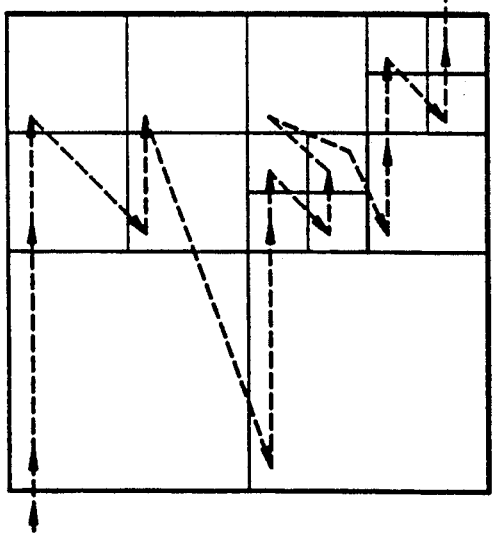
Figure 5D:
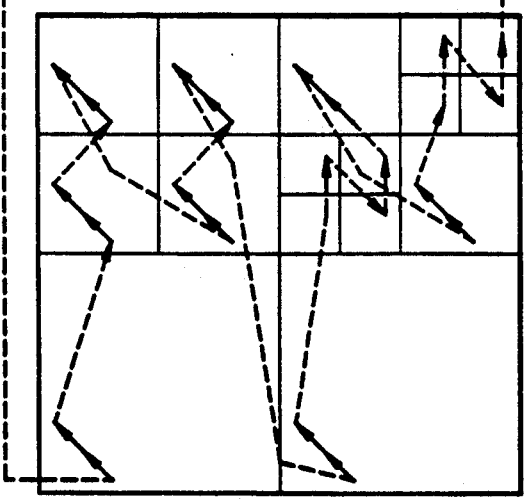

Accordingly, the output composite block QC from multiplexer 50 is input to zig-zag scan serializer 52 along with the BSA data (P, Q and R). FIG. 4a illustrates the zig-zag ordering of the block data within blocks and corresponding sub-blocks. FIG. 4b illustrates the ordering in the serialization between blocks and sub-blocks as determined by the BSA data.

The output of zig-zag scan serializer 52, comprised of the ordered 256 quantized DCT coefficients of the composite block QC, is input to coefficient buffer 54 where they are stored for run-length coding. The serialized coefficients are output from coefficient buffer 54 to a run-length coder 56 where run-length coding is preformed to separate out the zeros from the non-zero coefficients. Run-length as well as the non-zero coefficient values are separately provided to corresponding lookup tables. The run-length values are output from run-length coder 56 as an input of run-length code lookup table 58 where the values are Huffman coded. Similarly, the non-zero coefficient values are output from run-length coder 56 as an input to non-zero code lookup table 60 where the values are also Huffman coded. Although not illustrated it is further envisioned that run-length and non-zero code look up tables may be provided for each block size.

The Huffman run-length coded values along with the Huffman non-zero coded values are respectively output from run-length lookup code table 58 and non-zero code lookup table 60 as inputs to bit field assembler 62. An additional input to bit field assembler 62 is the BSA data from the P, Q and R registers. Bit field assembler 62 disregards the unnecessary bits provided from the P, Q and R registers. Bit field assembler 62 assembles the input data with BSA data followed by the combined RL codes and NZ codes. The combined data is output from bit field assembler 62 to a transmit buffer 64 which temporarily stores the data for transfer to the transmitter (not shown).

FIGS. 5a–5d illustrates an alternate scan and serialization format for the zig-zag scan serializer 52. In FIGS. 5a–5d, the quantized DCT coefficients are mapped into a one-dimensional string by ordering from low frequency to high frequency. However in the scheme illustrated in FIGS. 5a–5d the lower order frequencies are taken from each block prior to taking the next higher frequencies in the block. Should all coefficients in a block be ordered, during the previous scan, the block is skipped with priority given to the next block in the scan pattern. Block to block scanning, as was done with the scanning of FIGS. 4a–4c is a left-to-right, up to down scan priority.

Figure 6:
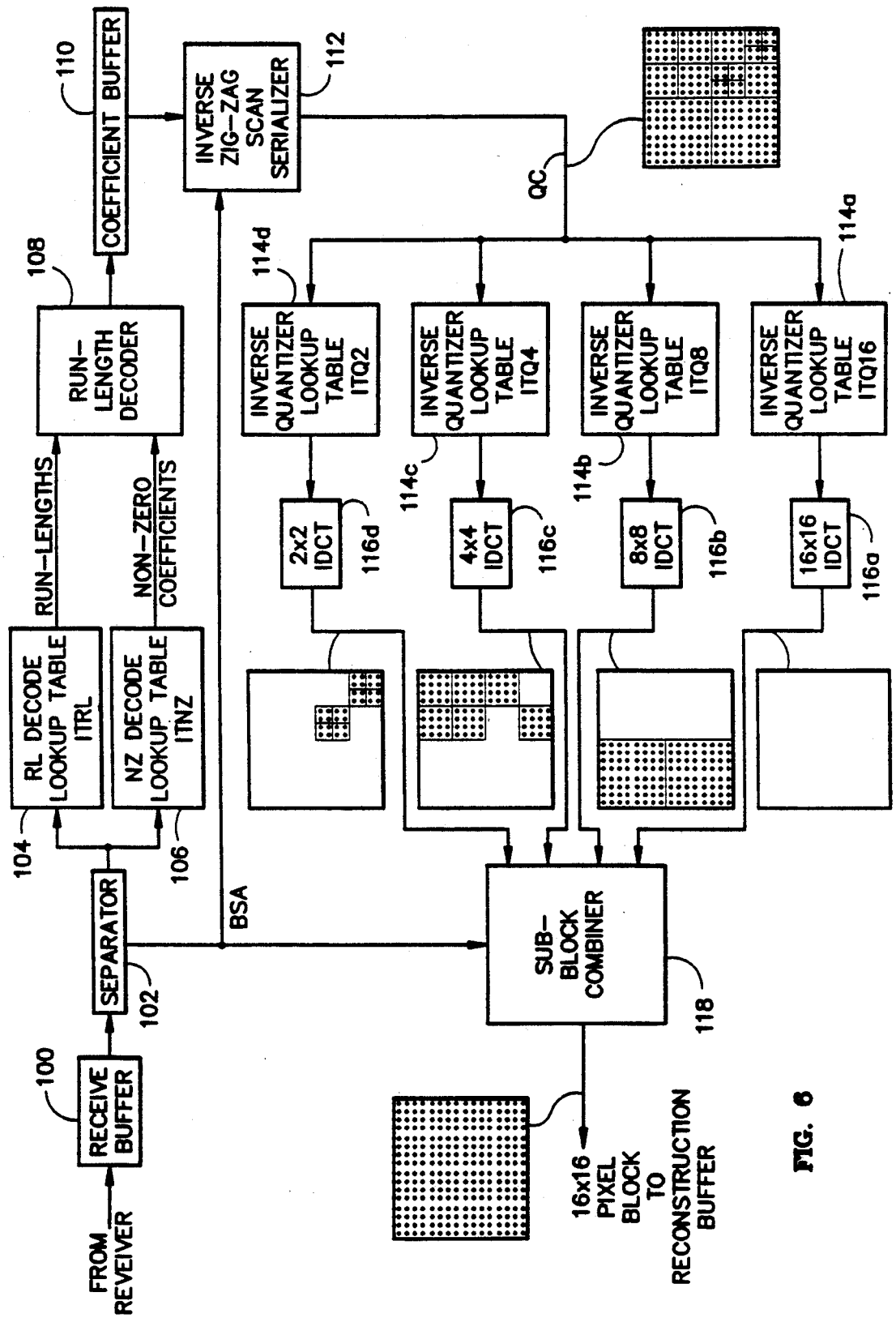
FIG. 6 is a block diagram illustrating the processing elements for decoding and reconstructing an image from a received signal generated by the processing elements of FIGS. 1 and 2.

FIG. 6 illustrates the implementation of a receiver for decoding the compressed image signal generated according to the parameters of FIGS. 1 and 2. In FIG. 6, the coded word is output from the receiver (not shown) to a receive buffer 100. Receive buffer 100 provides an output of the code word to BSA separator 102. Received code words include by their nature the BSA, RL codes and NZ codes. All received code words obey the prefix conditions such that the length of each code word need not be known to separate and decode the code words.

BSA separator 102 separates the BSA codes from the RL and NZ codes since the BSA codes are transmitted and received first before the RL and NZ codes. The first received bit is loaded into an internal R register (not shown) similar to that of FIG. 2. An examination of the R register determines that if the bit is a "0", the BSA code is only one bit long. BSA Separator 102 also includes Q and P registers that are initially filled with zeros. If the R register contains a "1" bit, four more bits are taken from the receive buffer and loaded into the Q register. Now for every "1" bit in the Q register, four more bits are taken from the receive buffer and loaded into the P register. For every "0" in the Q register, nothing is taken from the receive buffer but four "0" are loaded into the P register. Therefore, the possible lengths of the BSA code is 1, 5, 9, 13, 17 and 21 bits. The decoded BSA data is output from BSA separator 102.

BSA separator 102 further separates, and outputs, the RL codes and NZ codes respectively to RL decode lookup table 104 and NZ decode lookup table 106. Lookup tables 104 and 106 are essentially inverse lookup tables with respect to lookup tables 58 and 60 of FIG. 2. The output of lookup table 104 is a value corresponding to the run-length and is input to run-length decoder 108. Similarly the non-zero coefficient values output from lookup table 106 is also input to run-length decoder 108. Run-length decoder 108 inserts the zeros into the decoded coefficients and provides an output to coefficient buffer 110 which temporarily stores the coefficients. The stored coefficients are output to an inverse zig-zag scan serializer 112 which orders the coefficients according to the scan scheme employed. Inverse zig-zag scan serializer 112 receives the BSA signal from separator 102 to assist in proper ordering of the block and sub-block coefficients into a composite coefficient block. The block of coefficient data is output from inverse zig-zag scan serializer 112 and respectively applied to a corresponding inverse quantizer lookup table 114a-114d. An inverse quantizer value is applied to each coefficient to undo the quantization. Inverse quantizer lookup tables 114a-114d may be employed as ROM devices which contain the quantization factors from that of quantizer lookup tables 12a-12d. The coefficients are output from each of inverse quantizer look up tables 114a-114d to corresponding inverse discrete cosine transform (IDCT) elements 116a-116d.

IDCT element 116a forms from the 16×16 IDCT coefficient block, if present, a 16×16 pixel data block which is then output to sub-block combiner 118. Similarly, DCT 116b transforms respective 8×8 blocks of coefficients, if present, to 8×8 blocks of pixel data. The output of IDCT element 116b is provided to sub-block combiner 118. IDCT elements 116c and 116d respective transform the 4×4 and 2×2 coefficient blocks, if present, to corresponding pixel data blocks which are provided to sub-block combiner 118. Sub-block combiner 118 in addition to receiving the outputs from IDCT elements 116a-116d also receives the BSA data from separator 102 so as to reconstruct the blocks of pixel data to a single 16×16 pixel block. The reconstructed 16×16 pixel block is output to a reconstruction buffer (not shown).

Figure 7:
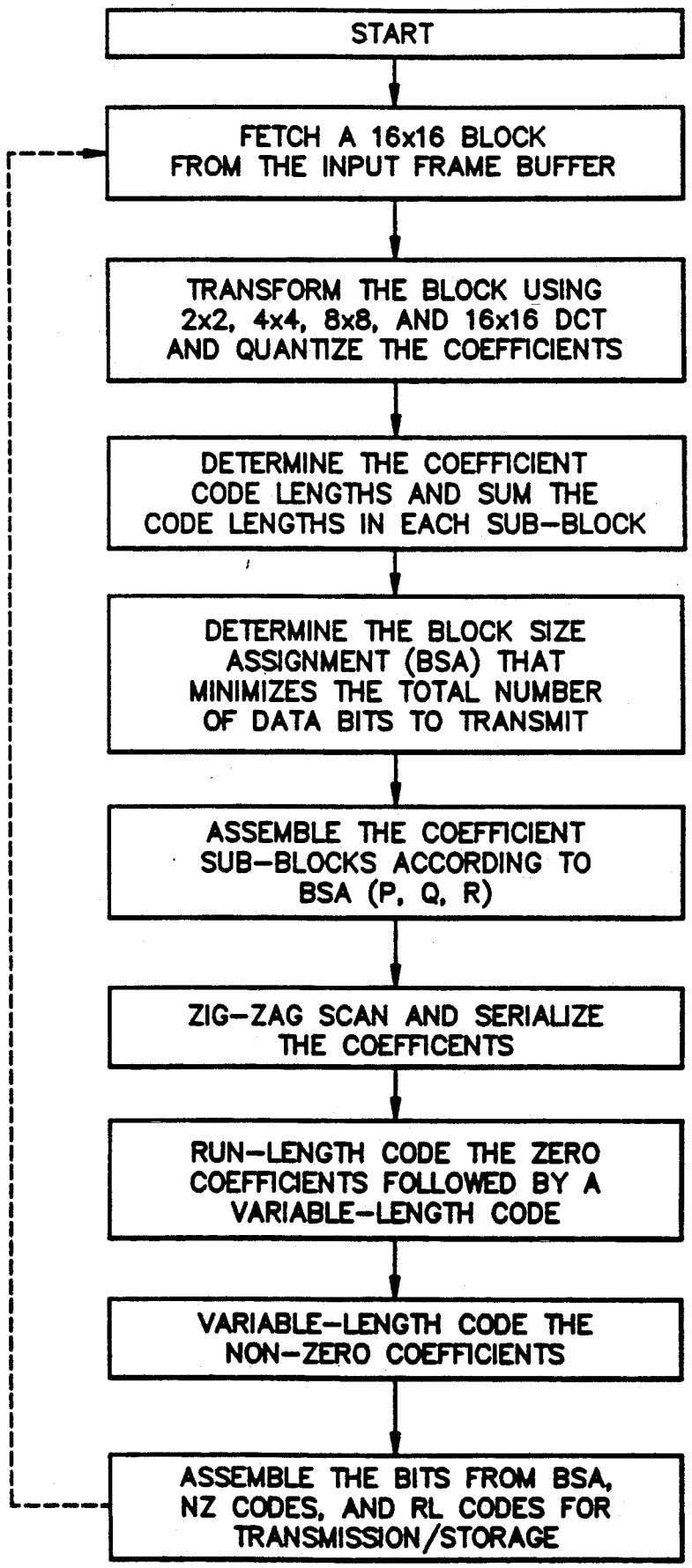
FIG. 7 is a flow chart illustrating the processing steps involved in compressing and coding image data as performed by the processing elements of FIGS. 1 and 2.
Figure 8:
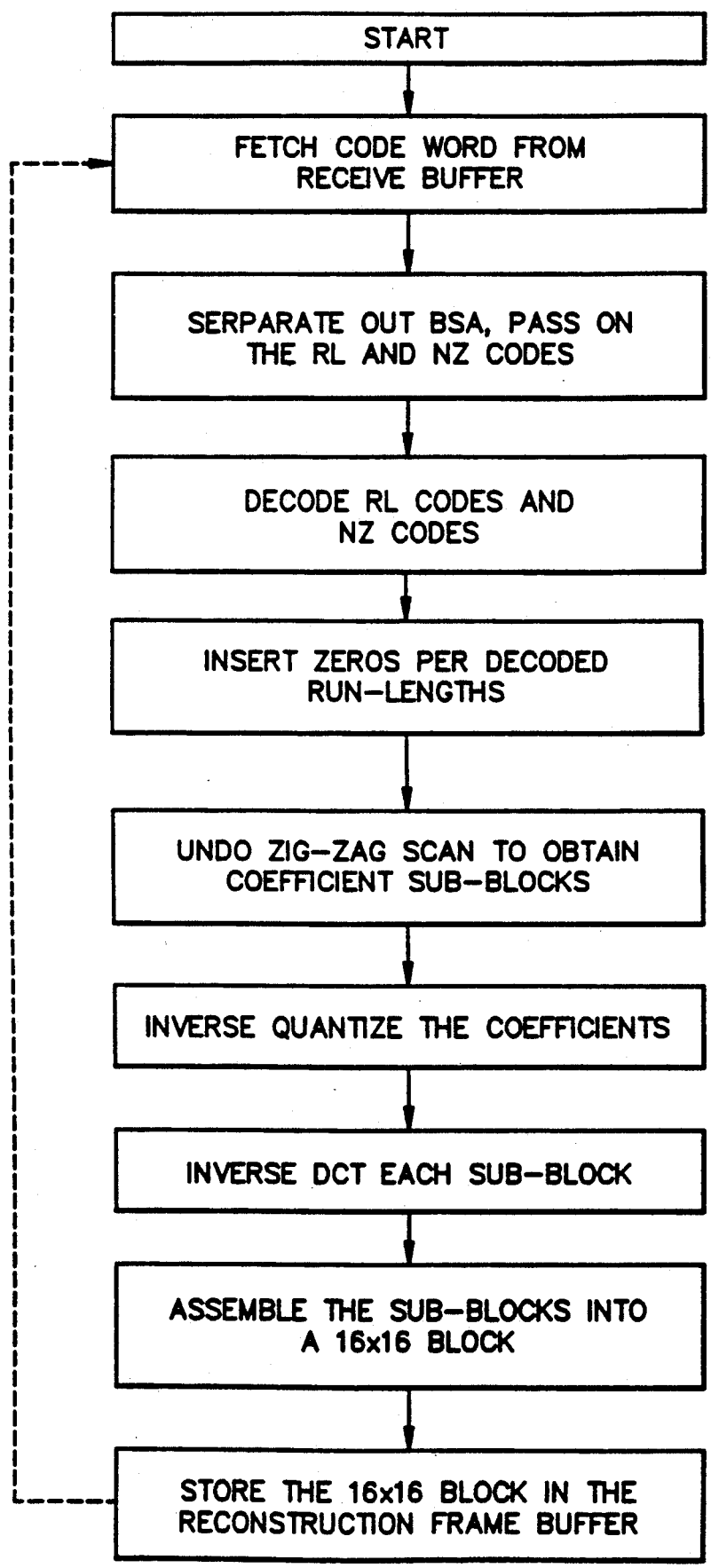
FIG. 8 is a flow chart illustrating the processing steps involved in decoding and decompressing the compressed signal so as to generate pixel data.

FIG. 7 illustrates in block diagram form a flow chart for signal compression of the present invention. FIG. 7 briefly illustrates the steps involved in the processing as discussed with reference to FIG. 1. Similarly FIG. 8 illustrates the decompression process of transmitted compressed image data to result in the output pixel data. The steps illustrated in FIG. 8 are previously discussed with reference to FIG. 6.

The present invention utilizes a unique adaptive block size processing scheme which provides substantially improved image quality without making a great sacrifice in the bit per pixel ratio. It is also believed that a bit per pixel ratio of about "1" and even substantially less than this level would provide substantial improvement in image quality sufficient for HDTV applications when using the techniques disclosed herein. It is envisioned that many variations to the invention may be readily made upon review of the present disclosure.

The present invention also envisions the implementation of a new and previously undisclosed transform identified herein as the differential quadtree transform (DQT). The basis for this transform is the recursive application of the 2×2 DCT on a quadtree representation of the sub-blocks. At the bottom of the inverted quadtree, for example that illustrated in FIG. 3b, the 2×2 DCT operation is performed and the node is assigned the DC value of the 2×2 DCT transform. The nearest nodes are gathered and another 2×2 DCT is performed. The process is repeated until a DC value is assigned to the root. Only the DC value at the root is coded at a fixed number of bits, typically 8-bits, while the rest are Huffman coded. Because each 2×2 DCT operation is nothing more than a sum and a difference of numbers, no multiplications are required, and all coefficients in the quadtree, except DC, represent the differences of two sums, hence the name DQT. Theoretically this type of transform cannot exceed the performance of 16×16 DCT coding. However the implementation of the DQT transform has the advantage of requiring seemingly simple hardware in addition to naturally implementing the adaptive block size coding. Furthermore the quadtree structure allows the coding of the zero coefficients by simply indicating the absence of a subtree when all sub-blocks under the subtree contain only zeros.

The previous description of the preferred embodiment is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. An image compression system for compressing a 16×16 block of pixel data comprising:

first transform means for receiving and performing 2×2 discrete cosine transform (DCT) operations on said block of pixel data, and providing a corresponding block of sixty-four 2×2 DCT coefficient value sub-blocks;

second transform means for receiving and performing 4×4 DCT operations on said block of pixel data, and providing a corresponding block of sixteen 4×4 DCT coefficient value sub-blocks;

third transform means for receiving and performing 8×8 DCT operations on said block of pixel data, and providing a corresponding block of four 8×8 DCT coefficient value sub-blocks;

fourth transform means for receiving and performing a 16×16 DCT operation on said block of pixel data, and providing a corresponding 16×16 DCT coefficient value block;

first memory means for storing bit values each corresponding to a number of bits required to encode according to a predetermined encoding format each different 2×2 DCT coefficient value, said first memory means for receiving each 2×2 DCT coefficient value sub-block and providing a corresponding first set of bit values;

second memory means for storing bit values each corresponding to a number of bits required to encode according to a predetermined encoding format each different 4×4 DCT coefficient value, said second memory means for receiving each 4×4 DCT coefficient value sub-block and providing a corresponding second set of bit values;

third memory means for storing bit values each corresponding to a number of bits required to encode according to a predetermined encoding format each different 8×8 DCT coefficient value, said third memory means for receiving each 8×8 DCT coefficient value sub-blocks and providing a corresponding third set of bit values;

fourth memory means for storing bit values each corresponding to a number of bits required to encode according to a predetermined encoding format each different 16×16 DCT coefficient value, said fourth memory means for receiving said 16×16 DCT coefficient value block and providing a corresponding fourth set of bit values;

first code length summer means for, receiving said first set of bit values, summing ones of said first set of bit values corresponding to each respective 2×2 DCT coefficient value sub-block and providing corresponding first code length sum values;

second code length summer means for, receiving said second set of bit values, summing ones of said second set of bit values corresponding to each respective 4×4 DCT coefficient value sub-block and providing corresponding second code length sum values;

third code length summer means for, receiving said third set of bit values, summing ones of said third set of bit values corresponding to each respective 8×8 DCT coefficient value sub-block and providing corresponding third code length sum values;

fourth code length summer means for, receiving said fourth set of bit values, summing said fourth set of bit values and providing a corresponding fourth code length sum value;

first adder means for receiving and adding predetermined groups of said first code length sum values, and providing corresponding first adder values;

first comparator means for receiving and comparing each first adder value with a predetermined corresponding second code length sum value, and providing a corresponding first comparison value;

first multiplexer means for receiving each first adder value, each corresponding second code length sum value, and each corresponding first comparison value and for providing a first multiplexer value selected from one of each first adder value and corresponding second code length sum value in accordance with said first comparison value;

first register means for receiving and storing in a predetermined order each first comparison value;

second adder means for receiving and adding predetermined groups of first multiplexer values, and providing corresponding second adder values;

second comparator means for receiving and comparing each second adder value with a predetermined corresponding third code length sum value, and providing a corresponding second comparison value;

second multiplexer means for receiving each second adder value, each corresponding third code length sum value, and each corresponding second comparison value and for providing a second multiplexer value selected from one of each second adder value and corresponding third code length sum value in accordance with said second comparison value;

second register means for receiving and storing in a predetermined order each second comparison value;

third adder means for receiving and adding said second multiplexer values, and providing a third adder value;

third comparator means for receiving and comparing said third adder value with said fourth code length sum value, and providing a corresponding third comparison value;

third register means for receiving and storing said third comparison value;

third multiplexer means for receiving each of said 2×2 DCT coefficient value sub-blocks, said 4×4 DCT coefficient value sub-blocks and a corresponding predetermined one of said first register means stored first comparison values, and for providing a third multiplexer value selected from one of groups of said 2×2 DCT coefficient value sub-blocks and a corresponding one of said 4×4 DCT coefficient value sub-blocks in accordance with said stored corresponding first comparison value;

fourth multiplexer means for receiving each third multiplexer value, said 8×8 DCT coefficient value sub-blocks and a corresponding predetermined one of said second register means stored second comparison values, and for providing a fourth multiplexer value selected from one each third multiplexer value and a corresponding one of said 8×8 DCT coefficient value sub-blocks in accordance with said stored corresponding second comparison value;

fifth multiplexer means for receiving each fourth multiplexer value, said 16×16 DCT coefficient value block and a corresponding predetermined one of said third register means stored third comparison values, and for providing a fifth multiplexer value selected from one each fourth multiplexer value and said 16×16 DCT coefficient value block in accordance with said stored corresponding third comparison value;

serializer means for receiving said fifth multiplexer value and each of said stored first, second and third comparison values, for ordering DCT coefficient values of said fifth multiplexer value in accordance with said stored first, second and third comparison values and for providing a corresponding output of serialized DCT coefficient values;

encoder means for receiving and encoding said serialized DCT coefficients according to said predetermined encoding format and for providing corresponding encoder output values; and assembler means for receiving and ordering said encoder output values and said stored first, second and third comparison values according to a predetermined format, and for providing a corresponding assembler output values.

2. The system of claim 1 further comprising:

first quantizer means for receiving and quantizing said block of 2×2 DCT coefficient values according to a first predetermined quantization scheme, and for providing a corresponding block of 2×2 quantized DCT coefficient values to said first memory means;

second quantizer means for receiving and quantizing said block of 4×4 DCT coefficient values according to a second predetermined quantization scheme, and for providing a corresponding block of 4×4 quantized DCT coefficient values to said second memory means;

third quantizer means for receiving and quantizing said block of 8×8 DCT coefficient values according to a third predetermined quantization scheme, and for providing a corresponding block of 8×8 quantized DCT coefficient values to said third memory means; and fourth quantizer means for receiving and quantizing said block of 16×16 DCT coefficient values according to a fourth predetermined quantization scheme, and for providing a corresponding block of 16×16 quantized DCT coefficient values to said fourth memory means.

3. The system of claim 1 wherein each of said first, second, third and fourth transform means comprises a DCT transform processor.

4. The system of claim 1 further comprising sixth multiplexer means for receiving said third adder value, said fourth code length sum value, and each corresponding third comparison value and for providing a third multiplexer value selected from said third adder value and said fourth code length sum value in accordance with said third comparison value, said third multiplexer value indicative of a total number of bits of encoded DCT coefficients for transmission.

5. The system of claim 1 further comprising coefficient buffer means for receiving and storing said serialized DCT coefficient values, and for providing said stored serialized DCT coefficient values to said encoder means.

6. The system of claim 1 wherein said encoder means comprises:

run-length encoder means for receiving and run-length encoding said serialized DCT coefficient values, and for providing a run-length value and a non-zero coefficient value;

run-length memory means for storing predetermined code values each corresponding to a different run-length value, said run-length memory means for receiving each of said run-length values and providing a corresponding coded run-length value; and non-zero coefficient memory means for storing predetermined code values each corresponding to a different non-zero coefficient value, said non-zero coefficient memory means for receiving each of said non-zero coefficient values and providing a corresponding coded non-zero coefficient.

7. The system of claim 1 wherein:

said first comparison value is indicative of one of each group of said 2×2 DCT coefficient value sub-blocks and corresponding 4×4 DCT coefficient value sub-block requiring a lesser of number of bits to encode according to said predetermined encoding format;

said second comparison value is indicative of one of each group of said 4×4 DCT coefficient value sub-blocks and corresponding 8×8 DCT coefficient value sub-block requiring a lesser of number of bits to encode according to said predetermined encoding format; and said third comparison value is indicative of a group of said 8×8 DCT coefficient value sub-blocks and said 16×16 DCT coefficient value block requiring a lesser of number of bits to encode according to said predetermined encoding format.

8. An image signal compression system comprising:

transform means for, receiving a 16×16 block of pixel data, performing a 16×16 discrete cosine transform (DCT) operation on said block of pixel data and providing a corresponding 16×16 block of DCT coefficient values, performing four 8×8 DCT operations on said block of pixel data and providing a corresponding block of four 8×8 DCT coefficient value sub-blocks, performing sixteen 4×4 DCT operations on said block of pixel data and providing a corresponding block of sixteen 4×4 DCT coefficient value sub-blocks, performing sixty-four 2×2 DCT operations on said block of pixel data and providing a corresponding block of sixty-four 2×2 DCT coefficient value sub-blocks;

quantization means for receiving and quantizing said 16×16 block of DCT coefficient values and each 8×8, 4×4 and 2×2 sub-block of DCT coefficient values, and for providing a corresponding 16×16 block of quantized DCT coefficients and corresponding 8×8, 4×4 and 2×2 sub-block of quantized DCT coefficient values;

block size assignment means for, receiving said 16×16 block of quantized DCT coefficient values and each 8×8, 4×4 and 2×2 sub-block of quantized DCT coefficient values, determining for said 16×16 block of quantized DCT coefficient values and each of corresponding groups of 8×8, 4×4 and 2×2 sub-blocks of quantized DCT coefficient values a bit count value corresponding to a number of bits required to respectively encode said 16×16 block of quantized DCT coefficient values and said corresponding groups of 8×8, 4×4 and 2×2 sub-blocks of quantized DCT coefficient values according to a predetermined coding format, determining from said bit count values ones of said 16×16 block of DCT coefficient values and said corresponding groups of 8×8, 4×4 and 2×2 sub-blocks of quantized DCT coefficient values requiring a lesser number of bits to encode according to said coding format, and providing a corresponding selection value;

selection means for, receiving said selection value and said 16×16 block of quantized DCT coefficient values and each 8×8, 4×4 and 2×2 sub-block of quantized DCT coefficient values, selecting ones of said 16×16 block of quantized DCT coefficient values and groups of 8×8, 4×4 and 2×2 sub-block of quantized DCT coefficient values in accordance with said selection value, and providing an output of a corresponding composite block of quantized DCT coefficient values formed from said selected ones of said 16×16 block of quantized DCT coefficient values and groups of 8×8, 4×4 and 2×2 sub-block of quantized DCT coefficient values;

ordering means for, receiving said composite block of quantized DCT coefficient values, ordering said composite block of quantized DCT coefficient values according to a predetermined ordering format, and providing a corresponding output of ordered quantized DCT coefficient values;

encoder means for, receiving said ordered quantized DCT coefficient values, coding said ordered quantized DCT coefficient values according to said predetermined coding format, and providing corresponding coded values; and assembler means for, receiving said selection value and said coded values, combining said selection value and said coded value as a coded image value representative of said block of pixel data with said coded image value of a reduced bit count with respect to a bit count of said block of pixel data, and providing an output of said coded image value.

9. The system of claim 8 wherein said transform means comprises:
- a 2×2 DCT element having an input for receiving said block of pixel data, and an output coupled to said quantization means;
- a 4×4 DCT element having an input for receiving said block of pixel data, and an output coupled to said quantization means;
- an 8×8 DCT element having an input for receiving said block of pixel data, and an output coupled to said quantization means; and
- a 16×16 DCT element having an input for receiving said block of pixel data, and an output coupled to said quantization means.

10. The system of claim 8 wherein said quantization means comprises:
- first memory means for, storing first quantization values, receiving each DCT coefficient value of each 2×2 sub-block of DCT coefficients, and providing corresponding quantized DCT coefficient values;
- second memory means for, storing second quantization values, receiving each DCT coefficient value of each 4×4 sub-block of DCT coefficient values, and providing corresponding quantized DCT coefficient values; and
- third memory means for, storing third quantization values, receiving each DCT coefficient value of each 8×8 sub-block of DCT coefficient values, and providing corresponding quantized DCT coefficient values; and
- fourth memory means for, storing fourth quantization values, receiving each DCT coefficient value of said 16×16 block of DCT coefficients value, and providing corresponding quantized DCT coefficient values.

11. The system of claim 9 wherein said quantization means comprises:
- a first quantization memory having an address input coupled to said 16×16 DCT element output, and an output coupled to said block size assignment means and said selection means;
- a second quantization memory having an address input coupled to said 8×8 DCT element output, and an output coupled to said block size assignment means and said selection means;
- a third quantization memory having an address input coupled to said 4×4 DCT element output, and an output coupled to said block size assignment means and said selection means; and
- a fourth quantization memory having an address input coupled to said 2×2 DCT element output, and an output coupled to said block size assignment means and said selection means.

12. The system of claim 11 wherein said block size assignment means comprises:

- a first code length memory having an address input coupled to said first quantizer memory output, and an output;
- a second code length memory having an address input coupled to said second quantizer memory output, and an output;
- a third code length memory having an address input coupled to said third quantizer memory output, and an output;
- a fourth code length memory having an address input coupled to said fourth quantizer memory output, and an output;
- a first code length summer having an input coupled to said first code length memory output, and an output;
- a second code length summer having an input coupled to said second code length memory output, and an output;
- a third code length summer having an input coupled to said third code length memory output, and an output;
- a fourth code length summer having an input coupled to said fourth code length memory output, and an output;
- a first adder having an input coupled to said first code length summer output, and an output;
- a first comparator having a pair of inputs respectively coupled to said second code length summer output and said first adder output, and an output;
- a first multiplexer having a pair of data inputs respectively coupled to said second code length summer output and said first adder output, a control input coupled said first comparator output, and an output;
- a second adder having an input coupled to said first multiplexer output, and an output;
- a second comparator having a pair of inputs respectively coupled to said third code length summer output and said second adder output, and an output;
- a second multiplexer having a pair of data inputs respectively coupled to said third code length summer output and said second adder output, a control input coupled said second comparator output, and an output;
- a third adder having an input coupled to said second multiplexer output, and an output; and
- a third comparator having a pair of inputs respectively coupled to said fourth code length summer output and said third adder output, and an output.

13. The system of claim 12 wherein said block size assignment means further comprises a third multiplexer having a pair of data inputs respectively coupled to said fourth code length summer output and said third adder output, a control input coupled said third comparator output, and an output.

14. The system of claim 12 wherein said selection means comprises:
- a first register having an input coupled to said first comparator output, and an output;
- a second register having an input coupled to said second comparator output, and an output;
- a third register having an input coupled to said third comparator output, and an output
- a third multiplexer having a pair of data inputs respectively coupled to said first and second quantization memory outputs, a control input coupled said first register output, and an output;

a fourth multiplexer having a pair of data inputs respectively coupled to said third quantization memory output and said third multiplexer output, a control input coupled said second register output, and an output; and a fifth multiplexer having a pair of data inputs respectively coupled to said fourth quantization memory output and said fourth multiplexer output, a control input coupled said second register output, and an output.

15. The system of claim 14 wherein said ordering means comprises a zig-zag scan serializer having a coefficient input and a control input coupled to said first, second and third register outputs.

16. The system of claim 15 further comprising:
a coefficient buffer having an input coupled to said zig-zag scan serializer output, and an output; and
a run-length coder having an input coupled to said coefficient buffer, and a non-zero coefficient value output and a run-length value output coupled to said encoder means.

17. The system of claim 8 wherein said encoder means comprises:
a Huffman coder having an input coupled to said ordering means and an output coupled to said assembler means.

18. The system of claim 16 wherein said encoder means comprises a Huffman coder comprised of:
a first encoder memory, storing Huffman code values, having an input coupled to said non-zero coefficient value output and an output coupled to said assembler means; and
a second encoder memory, storing Huffman code values, having an input coupled to said run-length coefficient value output and an output coupled to said assembler means.

19. A method for image signal compression of a block of pixel data comprising the steps of:
performing a 16×16 discrete cosine transform (DCT) operation on an 16×16 block of pixel data so as to provide a corresponding 16×16 block of DCT coefficient values;
performing four 8×8 DCT operations on said block of pixel data so as to provide a corresponding block of four 8×8 DCT coefficient value sub-blocks;
performing sixteen 4×4 DCT operations on said block of pixel data so as to
performing sixty-four 2×2 DCT operations on said block of pixel data so as to provide a corresponding block of sixty-four 2×2 DCT coefficient value sub-blocks;
determining bit count values corresponding to a number of bits required to respectively encode said 16×16 block of DCT coefficient values and predetermined groups of 8×8, 4×4 and 2×2 sub-blocks of DCT coefficient values according to a predetermined coding format;
determining, from said bit count values, ones of said 16×16 block of DCT coefficient values and said corresponding groups of 8×8, 4×4 and 2×2 sub-blocks of DCT coefficient values requiring a lesser number of bits to encode according to said predetermined coding format so as to provide a corresponding selection value;
selecting ones of said 16×16 block of DCT coefficient values and groups of 8×8, 4×4 and 2×2 sub-block of DCT coefficient values in accordance with said selection value;

generating a composite block of DCT coefficient values formed from said selected ones of said 16×16 block of DCT coefficient values and groups of 8×8, 4×4 and 2×2 sub-block of DCT coefficient values;
ordering said composite block of DCT coefficient values according to a predetermined ordering format so as to provide a corresponding output of ordered DCT coefficient values;
encoding said ordered DCT coefficient values according to said predetermined coding format so as to provide corresponding coded values; and
assembling said selection value and said coded values in a predetermined order as a coded image value representative of said block of pixel data.

20. The method of claim 19 further comprising the steps of:
quantizing each DCT coefficient value of said 16×16 block of DCT DCT coefficient values so as to provide to a corresponding 16×16 block of quantized DCT coefficient values;
quantizing each DCT coefficient value of each 8×8 sub-block of DCT coefficient values so as to provide corresponding 8×8 sub-blocks of quantized DCT coefficient values;
quantizing each DCT coefficient value of each 4×4 sub-block of DCT coefficient values so as to provide corresponding 4×4 sub-blocks of quantized DCT coefficient values; and
quantizing each DCT coefficient value of each 2×2 sub-block of DCT coefficient values so as to provide corresponding 2×2 sub-blocks of quantized DCT coefficient values.

21. The method of claim 20 further comprising the step of run-length encoding said ordered DCT coefficient values.

22. The method of claim 19 wherein said coding format is a Huffman coding format.

23. A system for decoding a compressed image signal comprising:
separator means for, receiving a compressed image signal representative of a selection value and coded values, separating said selection value and said coded values from one another, and providing an output of said separated selection value and said coded values;
decoder means for receiving and decoding according to a predetermined coding format said coded values, and for providing corresponding decoded values;
ordering means for, receiving said decoded values and said selection value, ordering said decoded values according to a predetermined ordering format in response to said selection value, and providing an output forming a composite block of one of a block of transform coefficient values and various sub-blocks of transform coefficient values;
inverse transform means for, receiving said composite block of transform coefficient values, performing an inverse transform operation on said one of said block and each sub-block of transform coefficient values of said composite block transform coefficient values, and providing an output of a corresponding one of a block of pixel data and sub-blocks of pixel data; and
combiner means for, receiving said one of said block of pixel data and said sub-blocks of pixel data, receiving said selection value, and in accordance with said selection value combining when present said sub-blocks of pixel data into a combined block of pixel data and providing one of said block of pixel data and said combined block of pixel data as an output block of pixel data.

24. The system of claim 23 wherein said decoder means comprises a Huffman decoder having an input coupled to said separator means and an output coupled to said ordering means.

25. The system of claim 23 wherein said separator means provides said coded values as encoded non-zero coefficient values and run-length coefficient values and wherein said decoder means comprises:
 a Huffman decoder comprising:
  (a) a first decoder memory, storing Huffman decode values, having an input for receiving said non-zero coefficient values and an output; and
  (b) a second decoder memory, storing Huffman code values, having an input for receiving said run-length coefficient values and an output; and
 a run-length decoder having a non-zero coefficient value input coupled to said first decoder memory output, a run-length coefficient value input coupled to said second decoder memory output and an output.

26. The system of claim 23 wherein said ordering means comprises an inverse zig-zag scan serializer having a coefficient input coupled to said decoder means, a control input for receiving said selection value and an output.

27. The system of claim 25 wherein said ordering means comprises:
 a coefficient buffer having an input coupled to said run-length decoder output and an output; and
 an inverse zig-zag scan serializer having a coefficient input coupled to said coefficient buffer output, a control input for receiving said selection value and an output.

28. The system of claim 23 wherein said ordering means provides an output of ones of a $16 \times 16$ block and $8 \times 8$, $4 \times 4$ and $2 \times 2$ sub-blocks of discrete cosine transform (DCT) coefficient values and wherein said inverse transform means comprises:
 first inverse discrete cosine transform (IDCT) means for receiving and performing a $2 \times 2$ inverse discrete cosine transform (IDCT) operation on each received $2 \times 2$ sub-block of DCT coefficient values, and providing corresponding sub-blocks of $2 \times 2$ pixel data;
 second IDCT transform means for receiving and performing a $4 \times 4$ IDCT operation on each received $4 \times 4$ sub-block of DCT coefficient values, and providing corresponding sub-blocks of $4 \times 4$ pixel data;
 third IDCT transform means for receiving and performing an $8 \times 8$ IDCT operation on each received $8 \times 8$ sub-block of DCT coefficient values, and providing corresponding sub-blocks of $8 \times 8$ pixel data; and
 fourth IDCT transform means for receiving and performing a $16 \times 16$ IDCT transform operation on said $16 \times 16$ block of DCT coefficient values, and providing a corresponding $16 \times 16$ block of pixel data.

29. The system of claim 23 wherein said transform coefficient values are of quantized coefficient values, said system further comprising inverse quantization means disposed between said ordering means and said transform means for receiving and inverse quantizing transform coefficient values of said composite composite block of transform coefficient values, and for providing corresponding quantized transform coefficient values to said inverse transform means.

30. The system of claim 28 wherein said $16 \times 16$ block and $8 \times 8$, $4 \times 4$ and $2 \times 2$ sub-blocks of discrete cosine transform (DCT) coefficient values are of quantized coefficient values, said system further comprising:
 first memory means for, storing first inverse quantization values, receiving each quantized DCT coefficient value of each $2 \times 2$ sub-block of DCT coefficient values, and providing corresponding inverse quantized DCT coefficient values;
 second memory means for, storing second inverse quantization values, receiving each quantized DCT coefficient value of each $4 \times 4$ sub-block of DCT coefficient values, and providing corresponding inverse quantized DCT coefficient values; and
 third memory means for, storing third inverse quantization values, receiving each quantized DCT coefficient value of each $8 \times 8$ sub-block of DCT coefficient values, and providing corresponding inverse quantized DCT coefficient values; and
 forth memory means for, storing forth inverse quantization values, for receiving each quantized DCT coefficient value of said $16 \times 16$ block of DCT coefficients value and providing corresponding inverse quantized DCT coefficient values.

31. A system for reconstructing a $16 \times 16$ block of pixel image data from a compressed image data signal comprising:
 data separator means for, receiving a compressed image data signal containing in a predetermined order a selection value, coded run-length values, and coded non-zero discrete cosine transform (DCT) coefficient values indicative of a compressed $16 \times 16$ block of pixel data, separating said selection value, said coded run-length values, and said coded non-zero DCT coefficient values, and providing corresponding outputs of said selection value, said coded run-length values and said coded non-zero DCT coefficient values;
 encoder means for, receiving and decoding according to a predetermined coding format each of said coded run-length values and said coded non-zero DCT coefficient values so as to provide decoded run-length values and non-zero DCT coefficient values, run-length decoding said run-length values and non-zero DCT coefficient values, and for providing an output of DCT coefficient values;
 inverse serializer means for, receiving said DCT coefficient values and said selection value, ordering said DCT coefficient values according to a predetermined ordering format in response to said selection value so as to provide a composite block of ones of a $16 \times 16$ block of DCT coefficient values and $8 \times 8$, $4 \times 4$ and $2 \times 2$ sub-blocks of DCT coefficient values;
 inverse quantization means for receiving and inverse quantizing each DCT coefficient of said composite block of DCT coefficient values, and for providing a corresponding output of a composite block of inverse quantized DCT coefficient values;
 inverse transform means for, performing a $16 \times 16$ inverse discrete cosine transform (IDCT) operation on said composite block of inverse quantized DCT coefficient values when comprised of a 16×16 block of inverse quantized DCT coefficient values, performing an 8×8 IDCT operation on each 8×8 sub-block of inverse quantized DCT coefficient values when comprised of at least one 8×8 sub-block of inverse quantized DCT coefficient values, performing a 4×4 IDCT operation on each 4×4 sub-block of inverse quantized DCT coefficient values when comprised of at least one 4×4 block of inverse quantized DCT coefficient values, performing a 2×2 IDCT operation on each 2×2 sub-block of inverse quantized DCT coefficient values when comprised of at least one 2×2 block of inverse quantized DCT coefficient values, and for providing a corresponding ones of a 16×16 block and 8×8, 4×4 and 2×2 sub-blocks of pixel data;

sub-block combiner means for receiving said selection value, receiving when output from said inverse transform means each of said 16×16 block and 8×8, 4×4 and 2×2 sub-blocks of pixel data, assembling said 16×16 block and said 8×8, 4×4 and 2×2 sub-blocks of pixel data into an output 16×16 block of pixel data.

32. The system of claim 31 wherein said inverse transform means comprises:

a 2×2 inverse discrete cosine transform (IDCT) element having an input for receiving 2×2 sub-blocks of quantized DCT coefficient values, and an output coupled to said sub-block combiner means;

a 4×4 IDCT element having an input for receiving 4×4 sub-blocks of quantized DCT coefficient values, and an output coupled to said sub-block combiner means;

an 8×8 IDCT element having an input for receiving 8×8 sub-blocks of quantized DCT coefficient values, and an output coupled to said sub-block combiner means; and a 16×16 IDCT element having an input for receiving a 16×16 block of quantized DCT coefficient values, and an output coupled to said sub-block combiner means.

33. The system of claim 33 wherein said inverse quantization means comprises:

first inverse quantizer means for receiving and inverse quantizing each 2×2 sub-block of quantized DCT coefficient values according to a first predetermined inverse quantization scheme, and for providing a corresponding 2×2 sub-block of inverse quantized DCT coefficient values to said 2×2 IDCT element input;

second inverse quantizer means for receiving and inverse quantizing each 4×4 sub-block of quantized DCT coefficient values according to a second predetermined inverse quantization scheme, and for providing a corresponding 4×4 sub-block of inverse quantized DCT coefficient values to said 4×4 IDCT element input;

third inverse quantizer means for receiving and inverse quantizing each 8×8 sub-block of quantized DCT coefficient values according to a third predetermined inverse quantization scheme, and for providing a corresponding 8×8 sub-block of inverse quantized DCT coefficient values to said 8×8 IDCT element input; and fourth inverse quantizer means for receiving and inverse quantizing said 16×16 block of quantized DCT coefficient values according to a fourth predetermined inverse quantization scheme, and for providing a corresponding 16×16 block of inverse quantized DCT coefficient values to said 16×16 IDCT element input.

34. The system of claim 33 wherein said encoder means comprises:

a Huffman decoder comprising:
(a) a first decoder memory, storing Huffman decode values, having an input for receiving said coded non-zero coefficient values and an output; and
(b) a second decoder memory, storing Huffman code values, having an input for receiving said coded run-length coefficient values and an output; and a run-length decoder having a non-zero coefficient value input coupled to said first decoder memory output, a run-length coefficient value input coupled to said second decoder memory output and an output coupled to said inverse serializer means.

35. The system of claim 34 further comprising a coefficient buffer disposed between said run-length decoder and said inverse serializer means, said coefficient buffer having an input coupled to said run-length decoder output and an output coupled to said inverse serializer means.

36. A method for reconstructing a block of pixel data from a compressed image data signal comprising the steps of:

receiving a compressed image data signal representative of a selection value and coded values;

separating said selection value and said coded values from one another so as to provide an output of said separated selection value and said coded values;

decoding according to a predetermined coding format said coded values so as to provide corresponding decoded values;

ordering said decoded values according to a predetermined ordering format in according to said selection value so as to provide an output forming a composite block of one of a block of transform coefficient values and various sub-blocks of transform coefficient values;

performing an inverse transform operation on said one of said block and each sub-block of transform coefficient values of said composite block of transform coefficient values so as to provide an output of a corresponding one of a block of pixel data and sub-blocks of pixel data; and combining in accordance with said selection value said sub-blocks of pixel data, when present, into a combined block of pixel data so as to provide one of said block of pixel data and said combined block of pixel data as an output block of pixel data.

37. The method of claim 36 wherein said step of decoding comprises the steps of:

storing Huffman decode values in a memory;

addressing said memory with said coded values; and providing a decoded value output from said memory corresponding to each input coded value.

38. The method of claim 36 wherein said step of ordering said decoded values comprises the step inverse zig-zag scan serializing said decoded values.

39. The method of claim 36 wherein said step of ordering said decoded values provides said composite block of transform coefficient values as ones of a 16×16 block and 8×8, 4×4 and 2×2 sub-blocks of discrete cosine transform (DCT) coefficient values and wherein said step of performing an inverse transform operation on said one of said block and each sub-block of transform coefficient values comprises the steps of:

performing a 2×2 inverse discrete cosine transform (IDCT) operation on each received 2×2 sub-block of DCT coefficient values so as to provide corresponding sub-blocks of 2×2 pixel data;

performing a 4×4 IDCT operation on each received 4×4 sub-block of DCT coefficient values so as to provide corresponding sub-blocks of 4×4 pixel data;

performing an 8×8 IDCT operation on each received 8×8 sub-block of DCT coefficient values so as to provide corresponding sub-blocks of 8×8 pixel data; and performing a 16×16 IDCT transform operation on said 16×16 block of DCT coefficient values so as to provide a corresponding 16×16 block of pixel data.

40. The method of claim 36 further comprising the step of inverse quantizing each transform coefficient value of said composite block of transform coefficient values.

41. The method of claim 38 further comprising the step of inverse quantizing each transform coefficient value of said composite block of transform coefficient values.

42. A method for reconstructing a 16×16 block of pixel image data from a compressed image data signal comprising:

receiving a compressed image data signal containing in a predetermined order a selection value, coded run-length values, and coded non-zero discrete cosine transform (DCT) coefficient values indicative of a compressed 16×16 block of pixel data;

separating said selection value, said coded run-length values, and said coded non-zero DCT coefficient values so as to provide corresponding outputs of said selection value, said coded run-length values and said coded non-zero DCT coefficient values;

decoding according to a predetermined coding format each of said coded run-length values and said coded non-zero DCT coefficient values;

run-length decoding said run-length values and non-zero DCT coefficient values so as to provide an output of DCT coefficient values;

ordering said DCT coefficient values according to a predetermined ordering format in response to said selection value so as to provide a composite block of ones of a 16×16 block of DCT coefficient values and 8×8, 4×4 and 2×2 sub-blocks of DCT coefficient values;

inverse quantizing each DCT coefficient of said composite block of DCT coefficient values so as to provide a corresponding output of a composite block of inverse quantized DCT coefficient values;

performing a 16×16 inverse discrete cosine transform (IDCT) operation on said composite block of inverse quantized DCT coefficient values when comprised of a 16×16 block of inverse quantized DCT coefficient values so as to provide a corresponding 16×16 block of pixel data;

performing an 8×8 IDCT operation on each 8×8 sub-block of inverse quantized DCT coefficient values when comprised of at least one 8×8 block of inverse quantized DCT coefficient values so as to provide corresponding 8×8 sub-blocks of pixel data;

performing a 4×4 IDCT operation on each 4×4 sub-block of inverse quantized DCT coefficient values when comprised of at least one 4×4 block of inverse quantized DCT coefficient values so as to provide corresponding 4×4 sub-blocks of pixel data;

performing a 2×2 IDCT operation on each 2×2 sub-block of inverse quantized DCT coefficient values when comprised of at least one 2×2 block of inverse quantized DCT coefficient values so as to provide corresponding 2×2 sub-blocks of pixel data;

combining in response to selection value said 8×8, 4×4 and 2×2 sub-blocks of pixel data into a composite 16×16 block of pixel data so as to provide one of said 16×16 block of pixel data and said composite 16×16 block of pixel data as a reconstructed 16×16 block of pixel data.

43. The method of claim 42 wherein said step of inverse quantizing comprises the steps of:

inverse quantizing each 2×2 sub-block of quantized DCT coefficient values according to a first predetermined quantization scheme so as to provide a corresponding 2×2 sub-block of quantized DCT coefficient values;

inverse quantizing each 4×4 sub-block of quantized DCT coefficient values according to a second predetermined inverse quantization scheme so as to provide a corresponding 4×4 sub-block of inverse quantized DCT coefficient values;

inverse quantizing each 8×8 sub-block of quantized DCT coefficient values according to a third predetermined inverse quantization scheme so as to provide a corresponding 8×8 sub-block of inverse quantized DCT coefficient values; and inverse quantizing said 16×16 block of quantized DCT coefficient values according to a fourth predetermined inverse quantization scheme so as to provide a corresponding 16×16 block of inverse quantized DCT coefficient values.

44. The method of claim 42 wherein said step of decoding according to a predetermined coding format each of said coded run-length values and said coded non-zero DCT coefficient values comprises the steps of:

Huffman decoding said coded run-length values so as to provide said decoded run-length values; and Huffman decoding said said coded non-zero DCT coefficient values so as to provide said non-zero DCT coefficient values.

45. The method of claim 43 wherein said step of decoding according to a predetermined coding format each of said coded run-length values and said coded non-zero DCT coefficient values comprises the steps of:

Huffman decoding said coded run-length values so as to provide said decoded run-length values; and Huffman decoding said said coded non-zero DCT coefficient values so as to provide said non-zero DCT coefficient values.

46. The method of claim 42 wherein said step ordering said DCT coefficient values according to a predetermined ordering format comprises the step of inverse zig-zag scan serializing said DCT coefficient wherein said selection value is indicative of DCT coefficients forming each 16×16 block of DCT coefficient values and each 8×8, 4×4 and 2×2 sub-blocks of DCT coefficient values of said composite block of DCT coefficient values.

47. The method of claim 45 wherein said step ordering said DCT coefficient values according to a predetermined ordering format comprises the step of inverse zig-zag scan serializing said DCT coefficients wherein said selection value is indicative of DCT coefficients forming each 16×16 block of DCT coefficient values and each 8×8, 4×4 and 2×2 sub-blocks of DCT coefficient values of said composite block of DCT coefficient values.

* * * * *